(12) United States Patent
Bok

(10) Patent No.: US 11,232,275 B2
(45) Date of Patent: Jan. 25, 2022

(54) DISPLAY DEVICE

(71) Applicant: Samsung Display Co., Ltd., Yongin-si (KR)

(72) Inventor: Seung Lyong Bok, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/983,981

(22) Filed: Aug. 3, 2020

(65) Prior Publication Data

US 2020/0364434 A1 Nov. 19, 2020

Related U.S. Application Data

(63) Continuation of application No. 15/495,983, filed on Apr. 25, 2017, now Pat. No. 10,733,408.

(30) Foreign Application Priority Data

Sep. 23, 2016 (KR) ........................ 10-2016-0122363

(51) Int. Cl.
*G06K 9/00* (2006.01)
*G06F 3/041* (2006.01)
*G06F 3/044* (2006.01)

(52) U.S. Cl.
CPC ........... *G06K 9/0002* (2013.01); *G06F 3/044* (2013.01); *G06F 3/0412* (2013.01);
(Continued)

(58) Field of Classification Search
CPC ...... G06F 3/0445; G06F 3/0412; G06F 3/044; G06F 2203/04102; G06F 2203/04103;
(Continued)

(56) References Cited

U.S. PATENT DOCUMENTS 6,454,414 B1 9/2002 Ting
7,916,167 B2 3/2011 Miyagawa et al.
(Continued)

FOREIGN PATENT DOCUMENTS

JP 2010230797 10/2010
KR 10-2010-0105431 9/2010
(Continued)

OTHER PUBLICATIONS

Hitachi Maxwell. Ltd., "Wet-coated Transparent Conductive Polymer Film", Sliontec Division, 2015.
(Continued)

*Primary Examiner* — Mekonen T Bekele
(74) *Attorney, Agent, or Firm* — H.C. Park & Associates, PLC

(57) ABSTRACT

A display device includes: a substrate including, in a plan view, a first area and a second area; a first sub-pixel disposed on the substrate, the first sub-pixel including an emission area disposed in the first area; a second sub-pixel disposed on the substrate, the second sub-pixel including an emission area disposed in the second area; a transmission area disposed on the substrate, the transmission area being adjacent to the second sub-pixel disposed in the second area; and a sensor disposed under the substrate, the photo sensor disposed in the second area. The emission area of the first sub-pixel has a first size and the emission area of the second sub-pixel has a second size different from the first size.

38 Claims, 16 Drawing Sheets

(52) U.S. Cl.
CPC ......... *G06F 3/0445* (2019.05); *G06K 9/0004* (2013.01); *G06F 2203/04102* (2013.01); *G06F 2203/04103* (2013.01); *G06F 2203/04106* (2013.01)

(58) Field of Classification Search
CPC ........ G06F 2203/04106; G06K 9/0004; G06K 9/0002
See application file for complete search history.

(56) References Cited

U.S. PATENT DOCUMENTS

| | | | |
|---|---|---|---|
| 7,936,121 | B2 | 5/2011 | Kim |
| 8,461,591 | B2 | 6/2013 | Lee et al. |
| 8,502,756 | B2 | 8/2013 | Nakamura et al. |
| 8,530,910 | B2 | 9/2013 | Song et al. |
| 8,598,582 | B2 | 12/2013 | Choi et al. |
| 8,659,218 | B2 | 2/2014 | Hwang et al. |
| 8,723,813 | B2 | 5/2014 | Park et al. |
| 9,024,907 | B2 | 5/2015 | Bolender |
| 9,046,955 | B1 | 6/2015 | Lee et al. |
| 9,059,121 | B2 | 6/2015 | Park et al. |
| 9,229,589 | B2 | 1/2016 | Lee et al. |
| 9,411,446 | B2 | 8/2016 | Lombardi et al. |
| 9,419,065 | B2 | 8/2016 | Degner et al. |
| 9,454,253 | B2 | 9/2016 | Kim et al. |
| 10,121,831 | B2 | 11/2018 | Rappoport et al. |
| 10,127,430 | B2 | 11/2018 | Kim et al. |
| 10,733,408 | B2* | 8/2020 | Bok ................ G06F 1/1684 |
| 10,733,412 | B2* | 8/2020 | Cui ................. H01L 27/124 |
| 2005/0259851 | A1 | 11/2005 | Fyke |
| 2006/0197753 | A1 | 9/2006 | Hotelling |
| 2008/0100204 | A1 | 5/2008 | Kim |
| 2008/0278665 | A1 | 11/2008 | Uemoto |
| 2009/0073107 | A1 | 3/2009 | Chen et al. |
| 2010/0053093 | A1 | 3/2010 | Kong et al. |
| 2013/0241858 | A1 | 9/2013 | Hung et al. |
| 2014/0183481 | A1 | 7/2014 | Lee et al. |
| 2014/0253822 | A1 | 9/2014 | Hong et al. |
| 2014/0347076 | A1 | 11/2014 | Baron et al. |
| 2015/0269409 | A1 | 9/2015 | Weber |
| 2015/0279278 | A1 | 10/2015 | Park et al. |
| 2016/0188082 | A1 | 6/2016 | Ham et al. |
| 2016/0266695 | A1 | 9/2016 | Bae et al. |
| 2016/0275910 | A1 | 9/2016 | Lee et al. |
| 2016/0350580 | A1 | 12/2016 | Pyun et al. |
| 2017/0097710 | A1* | 4/2017 | Bok ................ G06F 3/0412 |
| 2017/0115785 | A1* | 4/2017 | Seo ................. H01L 51/56 |
| 2017/0269749 | A1 | 9/2017 | Bok et al. |
| 2017/0277313 | A1* | 9/2017 | Lee ................. G06F 3/0446 |
| 2017/0317155 | A1 | 11/2017 | Kim et al. |
| 2018/0069053 | A1* | 3/2018 | Bok ................ G06F 3/0447 |
| 2018/0210604 | A1* | 7/2018 | Won ................ G06F 3/0446 |
| 2018/0315371 | A1 | 11/2018 | Rappoport et al. |
| 2019/0325190 | A1* | 10/2019 | Cui ................. H01L 27/3269 |
| 2019/0332842 | A1 | 10/2019 | Zhou et al. |
| 2020/0006403 | A1* | 1/2020 | Chen ............... G06K 9/2027 |
| 2020/0104562 | A1* | 4/2020 | Sung ............... G06K 9/0004 |

FOREIGN PATENT DOCUMENTS

| | | |
|---|---|---|
| KR | 10-2011-0057592 | 6/2011 |
| KR | 10-1124397 | 3/2012 |
| KR | 10-2014-0110349 | 9/2014 |
| KR | 10-2014-0136788 | 12/2014 |
| KR | 10-2015-0050318 | 5/2015 |
| KR | 10-2016-0032754 | 3/2016 |
| KR | 10-2016-0080069 | 7/2016 |
| KR | 10-1670447 | 10/2016 |
| KR | 10-2017-0109718 | 10/2017 |
| WO | 2010/041879 | 4/2010 |

OTHER PUBLICATIONS

Non-Final Office Action dated Nov. 29, 2018, issued in U.S. Appl. No. 15/495,983.
Final Office Action dated May 30, 2019, issued in U.S. Appl. No. 15/495,983.
Non-Final Office Action dated Oct. 18, 2019, issued in U.S. Appl. No. 15/495,983.
Notice of Allowance dated Mar. 25, 2020, issued in U.S. Appl. No. 15/495,983.
Notice of Allowance dated Dec. 3, 2021, issued to Korean Patent Application No. 10-2016-0122363.

* cited by examiner

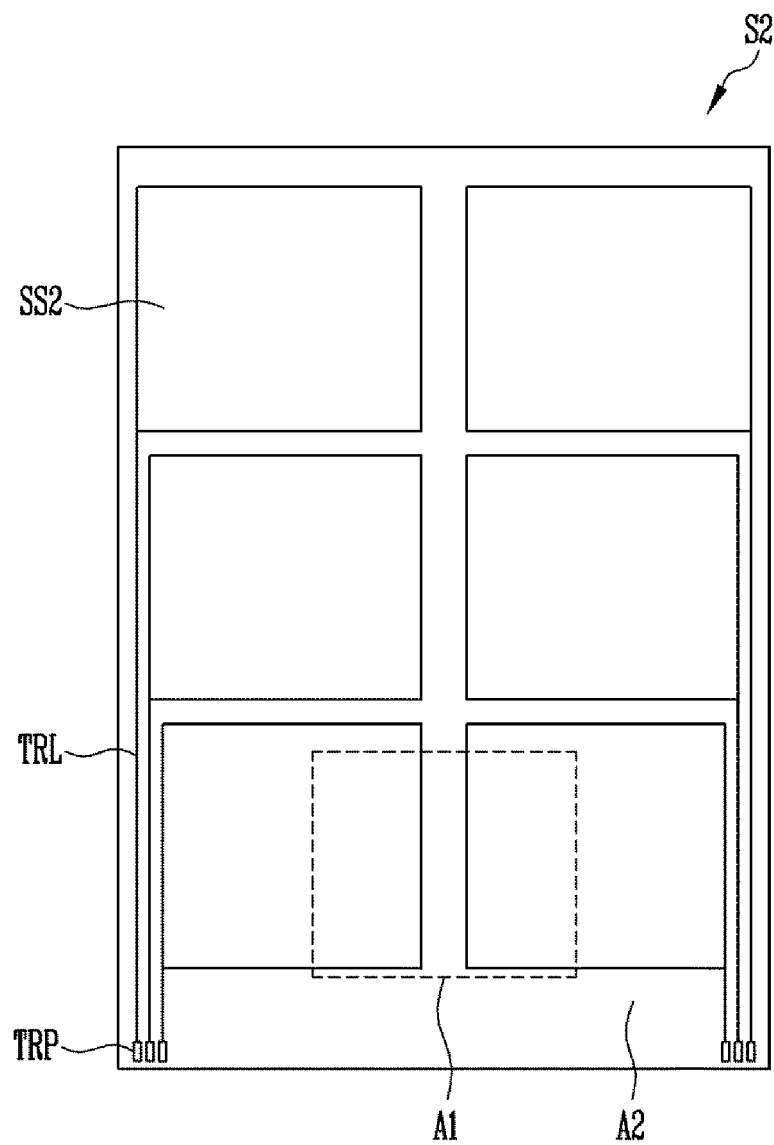

DISPLAY DEVICE

CROSS-REFERENCE TO RELATED APPLICATIONS

This application is a Continuation of U.S. patent application Ser. No. 15/495,983, filed on Apr. 25, 2017, which claims priority to and the benefit of Korean Patent Application No. 10-2016-0122363, filed on Sep. 23, 2016, which is hereby incorporated by reference for all purposes as if fully set forth herein.

BACKGROUND

Field

The invention relates generally to a display device, and, more particularly, to a display device including a fingerprint sensor.

Discussion of the Background

As interest in displays and demand for portable information media have increased, research in and commercialization of display devices have been attracted more attention.

Recently, a display device including a touch sensor for inputting a touch of a user has been commercialized. Accordingly, the user is more conveniently capable of using the display device through the touch sensor.

In addition, recently, a display device with a reinforced security function using fingerprints has been developed.

The above information disclosed in this Background section is only for enhancement of understanding of the background of the inventive concepts, and, therefore, it may contain information that does not form the prior art that is already known in this country to a person of ordinary skill in the art.

SUMMARY

Display devices constructed according to the principles of the invention are capable of enhancing a security function of the display device by including a fingerprint sensor having improved sensitivity.

In addition, display devices constructed according to the principles of the invention having improved fingerprint sensor sensitivity may be flexible display devices and may be capable of sensing a touch position and a touch pressure.

Additional aspects will be set forth in the detailed description which follows, and, in part, will be apparent from the disclosure, or may be learned by practice of the inventive concepts.

According to one aspect of the invention, a display device includes: a substrate including a first area having a first light transmittance and a second area adjacent to the first area having a second light transmittance; a plurality of pixels disposed on a first surface of the substrate; and a fingerprint sensor disposed in the first area on a second surface of the substrate. The first light transmittance is greater than the second light transmittance.

The plurality of pixels may include at least one first pixel in the first area and a second pixel in the second area.

The first pixel may include a light emitting area in which an image is displayed and a light transmission area in which a light is transmitted therethrough.

The first pixel may include at least one first sub-pixel disposed in the light emitting area. The first sub-pixel may include a first electrode disposed on the substrate; an emission layer disposed on the first electrode; and a second electrode disposed on the emission layer.

The display device may further include an insulating layer disposed between the substrate and the first electrode, wherein the insulating layer extends into the transmission area. The display device may further include at least one of a pixel defining layer and passivation layer disposed above the substrate, and wherein the insulating layer extends into at least one of the pixel defining layer and the passivation layer. In an exemplary embodiment, the first electrode and the second electrode may extend across the transmission area.

The first sub-pixel may further include at least one structure selected from the group of a hole injection layer, a hole transport layer, an electron transport layer, and an electron injection layer, the at least one structure being disposed between the first electrode and the second electrode, and wherein the at least one structured may extend across the transmission area.

The second pixel may include at least one second sub-pixel, and a size of the first sub-pixel is smaller than a size of the second sub-pixel. According to an exemplary embodiment, each of the first sub-pixel and the second sub-pixel may emit one wavelength of light selected from the group of red light, green light, and blue light.

The size of the first pixel may be the same as the size of the second pixel, and the fingerprint sensor may be a photo sensor or an ultrasonic sensor.

The display device may further include a first sensor disposed on the substrate to sense a touch position input by a user. Further, the first sensor may be a touch sensor of a self-capacitance type or a touch sensor of a mutual-capacitance type. The first sensor may include a first touch electrode; and a second touch electrode spaced apart from the first touch electrode and forming a capacitance with the first touch electrode.

The first touch electrode may have a mesh structure. The first touch electrode may include a conductive polymer.

The display device may further include a second sensor disposed on the first surface of the substrate spaced apart from the first sensor and sensing a touch pressure.

The second sensor may include a conductive polymer.

The first sensor may have a hole in the first area and touch electrodes of the first sensor may be disposed in the second area. Touch electrodes of the second sensor may include a portion in the first area and a portion in the second area.

A sensing type of the first sensor may be different from a sensing type of the second sensor.

At least a portion of the display device may be flexible and be bendable or rollable.

The light transmission area may be free of any light emitting components.

The first surface may include a front surface of the substrate and the second surface comprises a rear surface of the substrate.

According to another aspect of the invention, a display device includes: a substrate including a first area having a first light transmittance and a second area adjacent to the first area having a second light transmittance; a plurality of pixels disposed on a first surface of the substrate; and a first sensor disposed on the first surface of the substrate to sense a touch position; a second sensor disposed on the first surface of the substrate spaced apart from the first sensor to sense pressure applied by touch from a user; and a fingerprint sensor disposed in the first area on a second surface of the substrate.

The first area includes a light emitting area configured to display an image and a light transmission area configured to transmit light.

The transmission area may be free of any light emitting components.

According to still another aspect of the invention, a display device includes: a substrate including, in a plan view, a first area and a second area; a first sub-pixel disposed on the substrate, the first sub-pixel including an emission area disposed in the first area; a second sub-pixel disposed on the substrate, the second sub-pixel including an emission area disposed in the second area; a transmission area disposed on the substrate, the transmission area being adjacent to the second sub-pixel disposed in the second area; and a sensor disposed under the substrate, the photo sensor disposed in the second area. The emission area of the first sub-pixel has a first size and the emission area of the second sub-pixel has a second size different from the first size.

The sensor may be a fingerprint sensor.

The fingerprint sensor may be a photo sensor or an ultrasonic sensor.

The display device may further include: an insulating layer on the substrate. The transmission area may be formed by removing at least a portion of the insulating layer.

The second sub-pixel may include: a first electrode disposed on the substrate; an organic layer disposed on the first electrode; and a second electrode disposed on the emission layer. The second electrode may extend from the emission area of the second sub-pixel toward the transmission area, and the transmission area may include an opening formed by the second electrode of the second sub-pixel.

The display device may further include: a third sub-pixel disposed on the substrate, the third sub-pixel including an emission area disposed in the second area. Each of the second sub-pixel and the third sub-pixel may include: a first electrode disposed on the substrate; an emission layer disposed on the first electrode; and a second electrode disposed on the emission layer. The second electrode of the second sub-pixel and the second electrode of the third sub-pixel may be connected, and the transmission area may include an opening formed by the second electrode of the second sub-pixel and the second electrode the third sub-pixel.

The second sub-pixel may include: a first electrode disposed on the substrate; an organic layer disposed on the first electrode; and a second electrode disposed on the emission layer. The organic layer may not overlap the transmission area in the plan view.

At least one of the first electrode and the second electrode may extend into the transmission area and overlap the transmission area in the plan view.

The display device may further include: a touch sensor disposed on the substrate, the touch sensor comprising sensing electrodes. The sensing electrodes may not overlap the transmission area in the plan view.

The first size may be larger than the second size.

According to still another aspect of the invention, a display device includes: a substrate including, in a plan view, a first area and a second area; a first sub-pixel disposed on the substrate, the first sub-pixel including an emission area disposed in the first area; a second sub-pixel disposed on the substrate, the second sub-pixel including an emission area disposed in the second area; a transmission area disposed on the substrate, the transmission area being adjacent to the second sub-pixel disposed in the second area; and a touch sensor disposed on the substrate, the touch sensor comprising sensing electrodes. At least a portion of the second area comprises an area where the sensing electrodes and the transmission area may be not overlapped in the plan view.

The sensing electrodes may be not disposed in the second area.

The sensor may be a fingerprint sensor.

The fingerprint sensor may be a photo sensor or an ultrasonic sensor.

Accordingly, display devices constructed according to the principles of the invention provide an enhanced security function by including an improved fingerprint sensor.

Further, exemplary embodiments of the invention provide a high-quality display device in which resolution of an area including the fingerprint sensor is substantially the same as resolution of an area not including the fingerprint sensor.

In addition, exemplary embodiments of the invention provide a display device which is capable of sensing a touch position and a touch pressure while sensing the fingerprint thereby enhancing convenience of use.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIGS. 11A to 11C are plan views illustrating a second sensor according to exemplary embodiments.

DETAILED DESCRIPTION OF THE ILLUSTRATED EMBODIMENTS

Figure 1A:
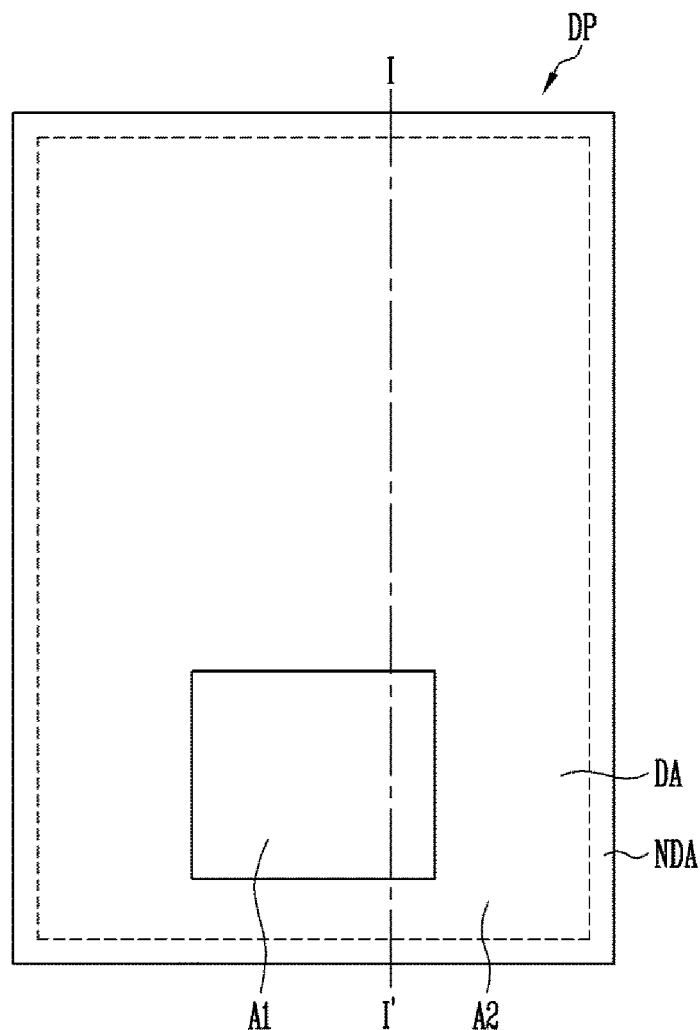
FIG. 1A is a plan view of a display device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
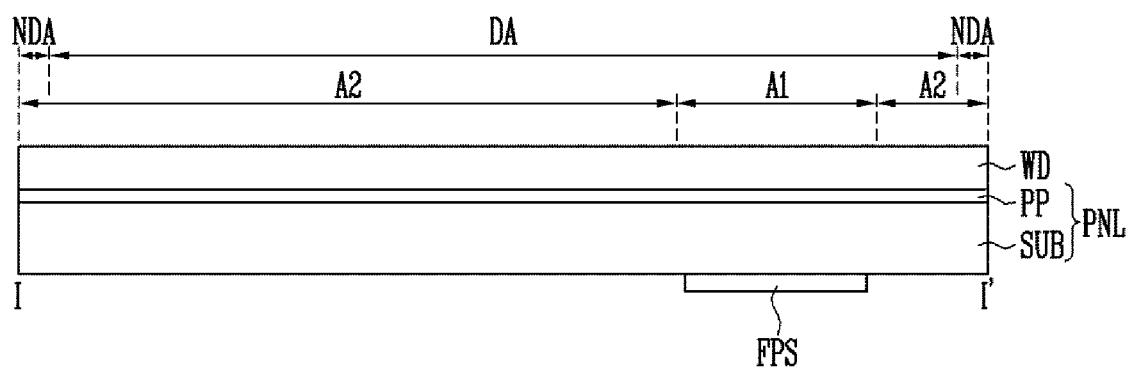
FIG. 1B is a cross-sectional view taken along a line I-I' of FIG. 1A.
Figure 2:
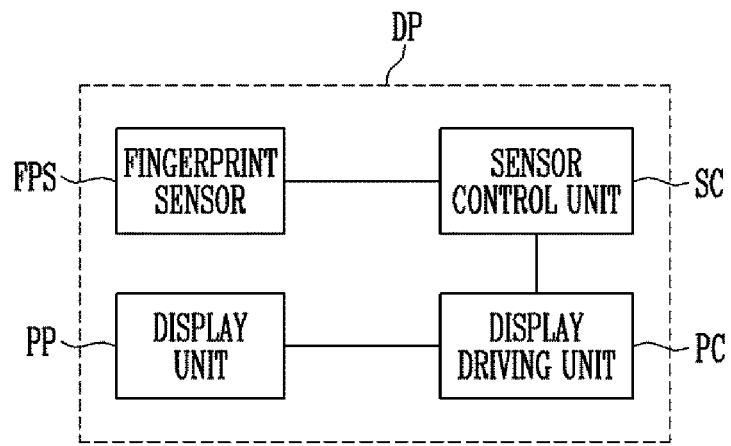
FIG. 2 is a block diagram graphically illustrating some of the components of an exemplary display device according to exemplary embodiments.

FIG. 1A is a plan view of a display device constructed according to the principles of the invention, and FIG. 1B is a cross-sectional view taken along a line I-I' of FIG. 1A. FIG. 2 is a block diagram graphically illustrating some of the components of an exemplary display device according to exemplary embodiments.

Referring to FIGS. 1A, 1B and 2, an exemplary display device DP includes a display panel PNL and a window WD disposed on a front surface of a display panel PNL.

The display panel PNL displays arbitrary visual information, for example a text, a video, a photo, 2 dimension or 3 dimension image, etc. to the front surface. The type of the display panel PNL that displays the image is not particularly important and the invention is not limited to a specific type of display device.

Thus, in an exemplary embodiment, the display panel PNL is described as an organic light emitting display panel as an example. However, the kind of the display panel PNL is not limited thereto, and other display panels PNL may be used in a scope of the invention.

The display panel PNL may be provided various shapes, for example a rectangular-plate shape having two pairs of sides parallel with each other. In the case where the display panel PNL is provided as the rectangular-plate shape, one pair of sides selected from two pairs of sides may be longer than the other pair of sides. In an exemplary embodiment, the shape of the display panel PNL is described as a rectangular shape having a pair of long sides and a pair of short sides for convenience of description.

However, the shape of the display panel PNL is not limited thereto, and the display panel PNL may have various shapes. For example, the display panel PNL may have various shapes such as an closed polygon including a side made of a straight line, a circle, an ellipse, and the like including a side made of a curved line, and a semicircle, a semi-ellipse, and the like including a side made of a straight line and a curved line. In an exemplary embodiment, when the display panel PNL has sides made of a straight line, at least a portion of edges of each shape may be made of the curved line. For example, when the display panel PNL has a rectangular shape, a portion, at which adjacent straight lines meet each other, may be replaced with a curved line having a predetermined curvature. That is, an apex of a rectangular shape may be made of a curved side of which opposite side adjacent to each other is connected to two straight sides and which has a predetermined curvature.

The curvature may be varied according to position. For example, the curvature may be varied according to a starting position of the curved line, a length of the curved line, etc.

An entire portion or at least one portion of the display panel PNL may have flexibility as is known in the art. For example, the display panel PNL may have flexibility in an entire area, or may have flexibility in one area corresponding to a flexible area.

The display panel PNL may display an image on a front surface. The display panel PNL includes a display area DA displaying an image via a display unit PP and a non-display area NDA disposed at least one side of the display area DA. For example, the non-display area NDA may enclose the display area DA.

The shape of the display area DA may correspond to the shape of the display device DP. For example, like the shape of the display device DP, the display area DA may have various shapes such as a closed polygon including a side made of a straight line, a circle, an ellipse, and the like including a side made of a curved line, and a semicircle, a semi-ellipse, and the like including a side made of a straight line and a curved line. In exemplary embodiments, the display area DA may have a rectangular shape.

The display panel PNL includes a first area A1 for sensing the fingerprint and a second area A2 adjacent to the first area A1. In exemplary embodiments, the size of the first area A1 may be smaller than the size of the second area A2. The first area A1 may have a size and a shape which are capable of sensing a fingerprint of a user with means known in the art. In exemplary embodiments, the first area A1 is shown and described as a rectangular shape for convenience of description, but is not limited thereto, and could have other shapes, such as a circle, an ellipse, a semicircle, a polygon, etc. The first area A1 may be enclosed by the second area A2, but is not limited thereto. In exemplary embodiments, the first area A1 may be only disposed at one side of the second area A2.

The first area A1 may be disposed in the display area DA. The second area A2 may be disposed in the display area DA and the non-display area NDA. However, the position of the first area A1 and the second area A2 are not limited thereto, and the first area A1 and the second area A2 may be disposed in various positions. For example, a portion of the first area A1 may be disposed in the non-display area NDA. Alternatively, both first area A1 and second area A2 may be disposed only in the display area DA.

In exemplary embodiments, in order to sense the fingerprint through the first area A1, the first area transmits more light therethrough than the second area. In exemplary embodiments, as the light transmittance of the first area A1 is higher than the light transmittance of the second area, the sensing power and sensitivity of the fingerprint sensor, described below, may be improved.

A window WD is disposed on a front surface of the display panel PNL. The window WD has a plate-like shape corresponding to the shape of the display panel PNL and covers at least one portion of the front surface of the display panel PNL. For example, when the display panel PNL has a rectangular shape, the window WD has also a rectangular shape corresponding to the display panel PNL. In addition, when the display panel PNL has a circle shape, the window WD has also a circle shape corresponding to the display panel PNL.

The window WD transmits an image emitted from the display panel PNL and simultaneously protects against impact from the outside, thereby preventing the display panel PNL from being damaged or malfunction. Term "the impact from the outside" means external power such as a pressure, a stress, or the like, that may cause defects in the display panel PNL.

An entire portion or at least one portion of the window WD may have flexibility. For example, the window WD may have flexibility in an entire area, or may have flexibility in one area corresponding to a flexible area.

In detail, the display panel PNL includes a substrate SUB, a display unit PP disposed on a front surface of the substrate SUB, and a fingerprint sensor FPS disposed on a rear surface of the substrate SUB.

The substrate SUB may be made of an insulating material such as a quartz, a synthetic quartz, a calcium fluoride, a fluorine-doped quartz, a soda-lime glass, a non-alkali glass, a resin, etc. In addition, the substrate SUB may be made of a flexible material so as to be bendable or foldable, and may have a single-layer structure or a multi-layer structure.

For example, the substrate SUB may include at least one material selected from polystyrene, polyvinyl alcohol, polymethylmethacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material forming the substrate SUB may be variously changed, and the substrate SUB may be made of a glass fiber reinforced plastics (GFRP), or other materials known in the art.

In exemplary embodiments, the substrate SUB may be a polyimide substrate. The polyimide substrate may be made of a first polyimide layer, a barrier film layer, a second polyimide layer, etc. When the polyimide substrate is thin and flexible, the polyimide substrate may be formed on a hard carrier substrate to support a light emitting structure.

That is, in exemplary embodiments, the substrate SUB may have a structure in which the first polyimide layer, the barrier film layer, and the second polyimide layer are stacked on the carrier substrate. For example, after an insulating layer is formed on the second polyimide, a thin film transistor, a light emitting element, and the like may be formed on the insulating layer.

After forming this light emitting structure, the carrier substrate may be removed. Since the polyimide substrate is thin and flexible, the light emitting structure may be difficult to be formed on the polyimide substrate. Considering this, after forming the light emitting structure by using a rigid carrier substrate, the carrier substrate is removed, thereby using the polyimide substrate as the substrate SUB.

The substrate SUB has a front surface and a rear surface opposite to the front surface.

Since the substrate SUB is a portion of the display panel PNL, each of areas of the substrate SUB is described as corresponding to each of the display area DA, the non-display area NDA, the first area A1, and the second area A2 refers the display area DA, the non-display area NDA, the first area A1, and the second area A2 for convenience of description.

The display unit PP may be disposed on the front surface of the substrate SUB. In exemplary embodiments, the display unit PP may be disposed in the display area DA except the non-display area NDA. The display unit PP is disposed in each of the first area A1 and the second area A2.

The display unit PP displays information input by a user or information providing to the user as an image as known in the art. In other words, the display unit PP displays data input by a user and the result of an operation performed by the user and/or a reaction according to the input data. The display unit PP will be described later.

The fingerprint sensor FPS is disposed on the rear surface of the substrate SUB, and may be any number of known elements for sensing the fingerprint of the user, as discussed below. The fingerprint sensor FPS is only disposed in the first area A1 of the rear surface of the substrate SUB and is not disposed in the second area A2. The fingerprint sensor FPS may be connected to a sensor control unit SC through a separate wire, a flexible printed circuit substrate, a tape carrier package, a connector, a chip on film, or other means known in the art. The fingerprint sensor FPS may be a photo sensor or an ultrasonic sensor. The fingerprint sensor according to exemplary embodiments may be a photo sensor, and the photo sensor may recognize a fingerprint by distinguishing a wavelength of reflected light changed according to a ridge or a valley of the fingerprint which contacts the display panel PNL of the display device DP. The fingerprint sensor FPS may recognize the fingerprint not only when a finger of the user is in contact therewith, but also when the finger moves into a state of being in contact therewith. However, the fingerprint sensor FPS according to exemplary embodiments is not limited thereto, and may include various types. For example, the fingerprint sensor may be a capacitive type, a heat sensing type, a non-contact type, or other types of fingerprint sensors known in the art.

Referring to FIG. 2, the display device DP according to exemplary embodiments may further include a sensor control unit SC and a display driving unit PC.

The sensor control unit SC may control an operation of the fingerprint sensor FPS, and may sense a variation of light in the fingerprint sensor FPS, thereby sensing the fingerprint of the user.

The display driving unit PC provides an image driving signal to the display panel PNL, thereby controlling an image display operation of the display panel PNL. For this purpose, the display driving unit PC may generate the image driving signal by using an image data and a control signal provided from the outside. For example, the display driving unit PC may be provided the image data and the control signal from a host (not shown), and the control signal may have a vertical synchronization signal, a horizontal synchronization signal, a main clock signal, and the like. In addition, the image driving signal may include a scan signal and a data signal generated by using the image data.

The sensor control unit SC and the display driving unit PC may be integrated into a single configuration. For example, the sensor control unit SC and the display driving unit PC may be disposed in a single IC (integrated circuit).

Figure 3:
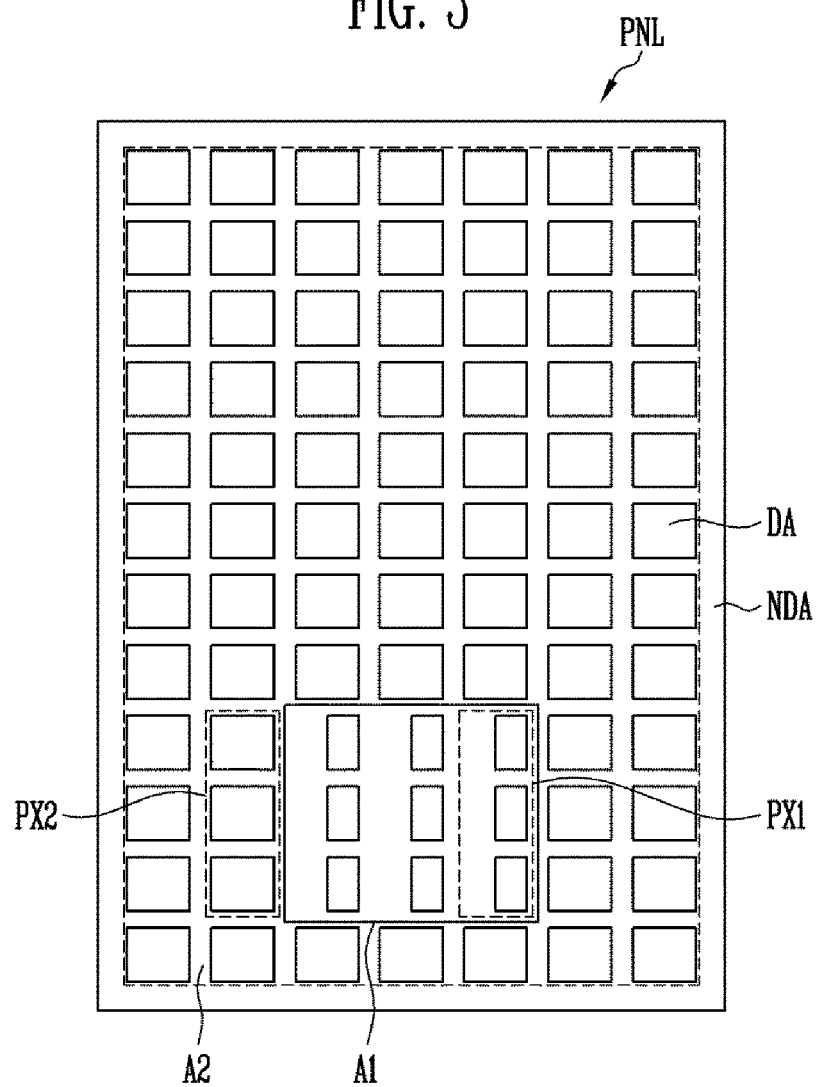
FIG. 3 is a plan view illustrating an exemplary display panel constructed according to the principles of the invention.

FIG. 3 is a plan view illustrating an exemplary a display panel constructed according to the principles of the invention. Specifically, FIG. 3 shows a display unit PP (referring to FIG. 1B) of a display panel PNL.

Referring to FIG. 3, the display unit PP includes a first area A1 for sensing the fingerprint and the second area A2 adjacent to the first area A1. The first pixel PX1 is disposed in the first area A1, and the second pixel PX2 is disposed in the second area A2.

In exemplary embodiments, the size of the first pixel PX1 in the first area A1 may be substantially the same as the size of the second pixel PX2 in the second area A2. Therefore, the number of first pixels PX1 per unit area in the first area A1 may be substantially the same as the number of second pixels PX2 per unit area in the second area A2. Accordingly, the resolution of an area (i.e., the first area A1) in which the fingerprint sensor is disposed may be substantially the same as the resolution of an area (i.e., the second area A2) in which the fingerprint sensor is not disposed.

Figure 4A:
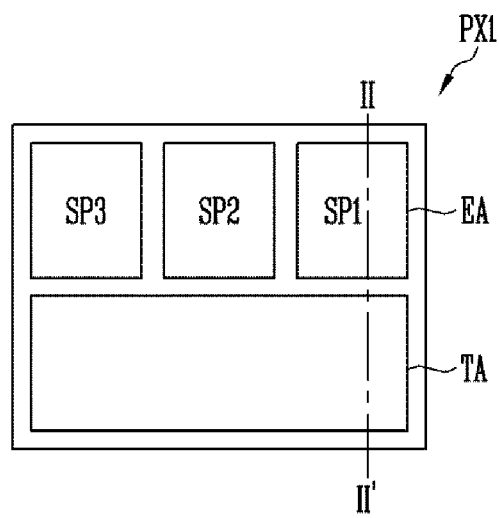
FIG. 4A is a plan view illustrating a first pixel of FIG. 3 rotated by 90 degrees from the position shown in FIG. 3.
Figure 4B:
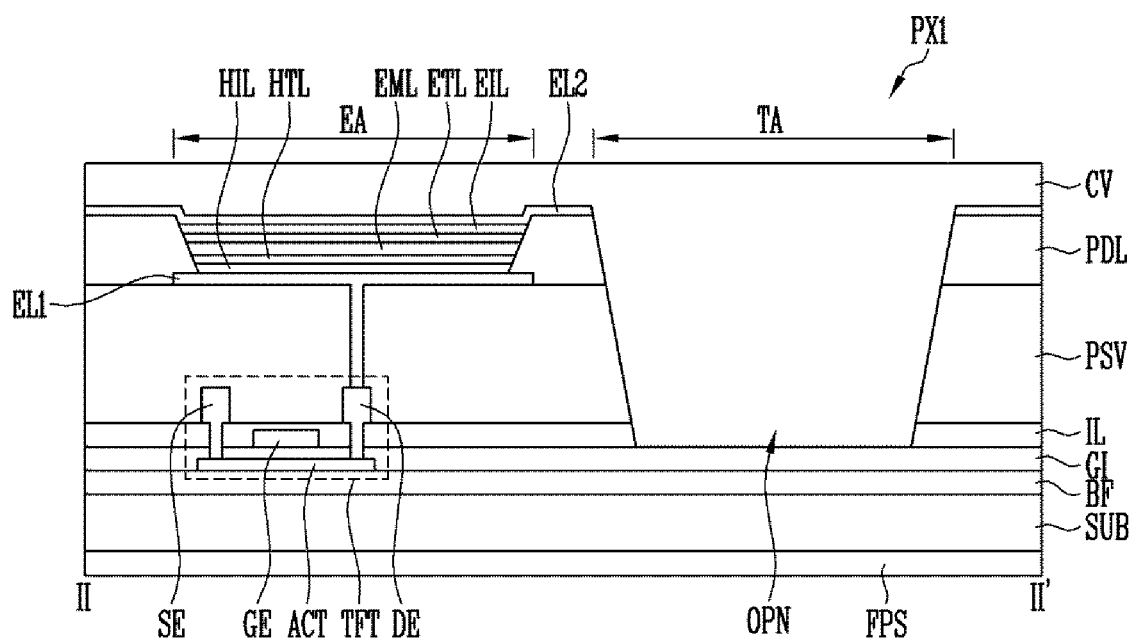
FIG. 4B is a cross-sectional view of a first embodiment of the first pixel taken along a line II-II' of FIG. 4A.

FIG. 4A is a plan view illustrating a first pixel of FIG. 3 rotated by 90 degrees from the position shown in FIG. 3, and FIG. 4B is a cross-sectional view of a first embodiment of the first pixel taken along a line of FIG. 4A.

First, referring to FIG. 3, in the display device DP according to exemplary embodiments, the display unit PP includes a plurality of pixels disposed in the display area DA. The plurality of pixels may be arranged as a matrix form having a row and a column. However, the pixels may be arranged in a different form from the matrix form, and in exemplary embodiments, pixels being arranged in regular rows and the columns are illustrated as an example for convenience of description.

The pixels according to exemplary embodiments include at least one first pixel PX1 disposed in the first area A1 and at least one second pixel PX2 disposed in the second area A2. Each of the first pixel PX1 and the second pixel PX2 may be in plural. The number of the pixels according to exemplary embodiments is set for convenience of description, the first pixel PX1 of a number more than an illustrated number may be provided in the first area A1, and the second pixel PX2 of a number more than an illustrated number may be provided in the second area A2.

Next, referring to FIGS. 4A and 4B, the first pixels PX1 are disposed in the first area A1. Each of the first pixels PX1 includes at least one first sub-pixel. In exemplary embodiments, the first pixel PX1 may include three first sub-pixels SP1, SP2, and SP3. However, the number of sub-pixels of the first pixel PX1 is not limited thereto. Three first sub-pixels SP1, SP2, and SP3 may be a blue sub-pixel, a green sub-pixel, and a red sub-pixel emitting respectively blue light, green light, and red light. However, the color of each of the first sub-pixels is not limited thereto, and the color of each of the first sub-pixels may be a color different from the color as described above, for example, magenta light, yellow light, cyan light, white light, or the like.

The first area A1 has a light emitting area EA in which light is emitted and a transmission area in which light is transmitted only and not emitted. The light emitting area EA and the transmission area TA may be disposed in each of the first pixels PX1, and one transmission area TA and three light emitting areas EA are shown and described as being disposed in each of the first pixels PX1 in FIGS. 4A and 4B for ease of illustration.

In exemplary embodiments, three light emitting areas EA are sequentially arranged in one direction (e.g., a horizontal direction in the drawing). The transmission area TA extends in one direction, e.g., horizontal as in the drawing. The light emitting area EA and the transmission area TA may have various shapes and numbers. For example, the light emitting area EA and the transmission area TA may be arranged in other directions (e.g., a vertical direction) different from one direction illustrated. In exemplary embodiments, the transmission area TA are also provided in plural, for example, three, and a plurality of transmission areas TA may be also disposed in one direction. Alternatively, the transmission area TA and the light emitting area EA may be alternately disposed in one direction. In exemplary embodiments, each of the transmission area TA and the light emitting area EA is illustrated as a quadrangle, but is not limited thereto, and may have various shapes such as a polygon, a circle, or the like.

The first sub-pixels may be disposed in each of the light emitting area EA. In other words, the first sub-pixels SP1, SP2, and SP3 may be disposed in the light emitting area EA except the transmission area TA.

The transmission area TA may have opening OPN so that light passes through the transmission area TA, and light is not emitted since the first sub-pixels are not disposed therein. The transmission area TA forms a path through which light or an ultrasonic wave moves to the fingerprint sensor FPS without interference from emitted light from a pixel.

Referring to FIG. 4B, the first pixel PX1 will be described below according to a stacking order.

The first sub-pixel is disposed in the light emitting area EA of the first pixel PX1.

The first sub-pixel according to exemplary embodiments may include an insulating layer, a pixel definition layer PDL, a thin film transistor TFT, a light emitting element, and a cover layer CV disposed on the substrate SUB. Herein, a thin film transistor TFT may include an active pattern ACT, a gate electrode GE, a source electrode SE, and a drain electrode DE. The insulating layer may include a buffer layer BF, a gate insulating layer GI, an interlayer insulating layer IL, and a passivation layer PSV. The light emitting element may include a first electrode EL1, a second electrode EL2, and an organic layer disposed between the first electrode EL1 and the second electrode EL2.

The buffer layer BF is disposed on the substrate SUB.

The buffer layer BF may prevent metal atoms or impurities from spreading from the substrate SUB, and during a crystallization process for forming the active pattern ACT, may control the speed of heat transfer, thereby obtaining a substantially uniform active pattern ACT. In addition, in the case where a surface of the substrate SUB is not uniform, the buffer layer BF may improve flatness of the surface of the substrate SUB. According to the type of the substrate SUB, two or more buffer layers BF may be provided, or the buffer layer BF may be not provided on the substrate SUB.

The active pattern ACT is disposed on the buffer layer BF. The active pattern ACT may include an oxide semiconductor, an inorganic semiconductor (i.e., amorphous silicon, poly silicon), an organic semiconductor, or the like.

The gate insulating layer GI may be disposed on the active pattern ACT. The gate insulating layer GI covers the active pattern ACT. The gate insulating layer GI may be entirely disposed on the substrate SUB. The gate insulating layer GI may be made of various insulating materials known in the art, such as a silicon oxide, a silicon nitride, a metal oxide, or the like.

The gate electrode GE may be disposed on a portion of the gate insulating layer GI corresponding to the active pattern ACT disposed therebelow. The gate electrode GE may be made of a metal, an alloy, a metal nitride, a conductive metal oxide, a transparent conductive material, or the like.

The interlayer insulating layer IL may be disposed on the gate electrode GE. The interlayer insulating layer IL may cover the gate electrode GE in the light emitting area EA, and may extend in one direction of the substrate SUB. That is, the interlayer insulating layer IL may be entirely disposed on the substrate SUB. The interlayer insulating layer IL may include a silicon compound, a metal oxide, or the like.

The source electrode SE and the drain electrode DE may be disposed on the interlayer insulating layer IL. The source electrode SE and the drain electrode DE may pass through a portion of both the gate insulating layer GI and the interlayer insulating layer IL, thereby being respectively connected to one side and other side of the active pattern ACT. Each of the source electrode SE and the drain electrode DE may include a metal, an alloy, a metal nitride, a conductive metal oxide, a transparent conductive material, or the like.

The passivation layer PSV may be disposed on the source electrode SE and the drain electrode DE. The passivation layer PSV may cover the source electrode SE and the drain electrode DE in the light emitting area EA, and may extend in one direction on the substrate SUB. That is, the passivation layer PSV may be entirely disposed on the substrate SUB. The passivation layer PSV may include a silicon compound, a metal oxide, or the like.

The first electrode EL1 may be disposed on the passivation layer PSV. The first electrode EL1 may pass through a portion of the passivation layer PSV, thereby being connected to the drain electrode DE. The first electrode EL1 may include a metal, an alloy, a metal nitride, a conductive metal oxide, a transparent conductive material, or the like.

The pixel definition layer PDL may be disposed on the passivation layer PSV while exposing a portion of the first electrode EL1. The pixel definition layer PDL may be made of an organic material or an inorganic material. In this case, the organic layer may be disposed on the first electrode EL1 of which at least a portion is exposed by the pixel definition layer PDL.

The organic layer may include a hole injection layer HIL, a hole transport layer HTL, an emission layer EML, an electron transport layer ETL, and an electron injection layer EIL. Like this exemplary embodiment, the hole injection layer HIL, the hole transport layer HTL, the electron transport layer ETL, and electron injection layer EIL all may be formed, but in other embodiments one or two layers thereof may be omitted. The emission layer may emit light of various colors based on the type of sub-pixel. The emission layer may emit for example, at least one wavelength selected from red light, blue light, and red light, but embodiments are not limited thereto. The emission layer may emit other color light.

The second electrode EL2 may be disposed on the pixel definition layer PDL and the organic layer. The second electrode EL2 may cover the pixel definition layer PDL and the organic layer, and may extend in one direction on the substrate SUB. The second electrode EL2 may be made of a metal, an alloy, a metal nitride, a conductive metal oxide, a transparent conductive material, or other materials known in the art. These may be used alone or in combination with each other.

The cover layer CV is disposed on the second electrode EL2.

The cover layer CV may be made of a single layer or a multi-layer. In exemplary embodiments, the cover layer CV may be made of a triple-layer. The cover layer CV may be made of an organic material and/or an inorganic material. The cover layer CV disposed at the outermost may be made of an inorganic material. In exemplary embodiments, the cover layer CV may be made of an inorganic material/an organic material/an inorganic material, but is not limited thereto. The organic material may include an organic insulating material such as a polyacryl compound, a polyimide compound, a fluorine carbon compound like a teflon, a benzocyclobutene compound, or the like, and the inorganic material may include a polysiloxane, a silicon nitride, a silicon oxide, silicon oxynitride, or the like.

Although not shown, an encapsulation layer may be further disposed on the cover layer CV. The encapsulation layer may be provided as a plate-shaped glass or a polymer film. The encapsulation layer may protect elements between the substrate SUB and the encapsulation layer from the outside.

The opening OPN is disposed in the transmission area TA of the first pixel PX1. The opening OPN may be formed by removing at least a portion of the insulating layer and elements for emitting light. For example, the opening OPN may be formed by the interlayer insulating layer IL, the passivation layer PSV, the pixel definition layer PDL, second electrode EL2, or the like. However, the elements removed from the opening OPN are not limited thereto, for example, the gate insulating layer GI or the buffer layer BF may be removed.

By forming the opening OPN in the transmission area TA of the first pixel PX1 in the first area A1, light passing through the opening OPN from an upper side to a lower side (e.g. ambient light) may directly reach the fingerprint sensor FPS in the first area A1, or light may pass through the opening OPN from the fingerprint sensor FPS to the upper side (provided that the fingerprint sensor FPS can emit light.

In exemplary embodiments, the transmission area TA may have a different shape from a shape described above.

Figure 4C:
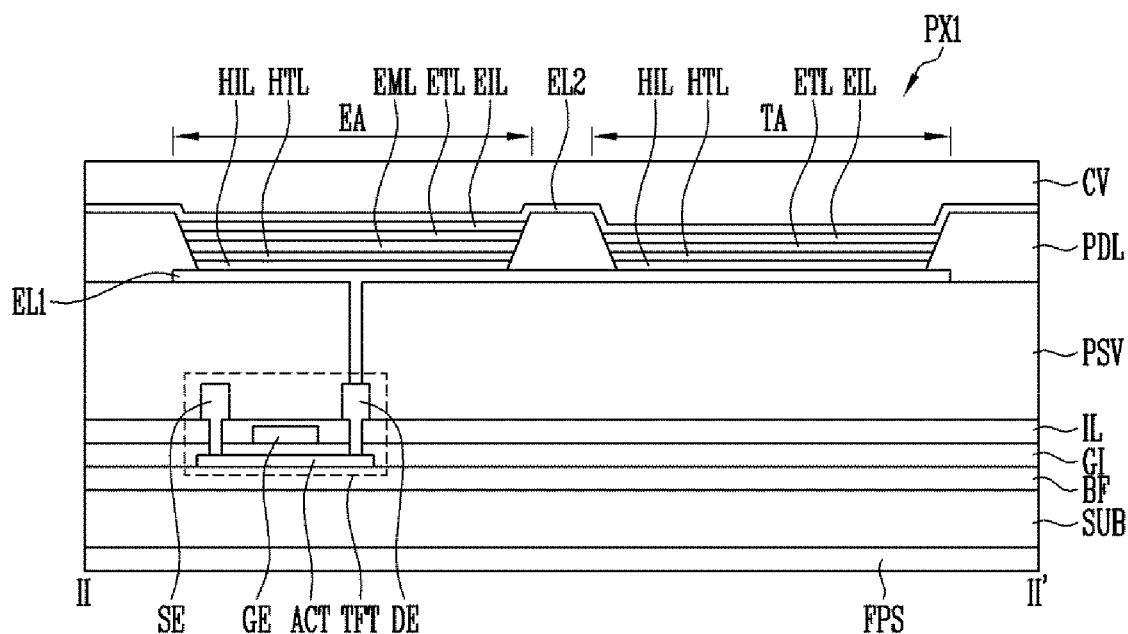
FIG. 4C is a cross-sectional view of a second embodiment of the first pixel taken along a line II-II' of FIG. 4A.

FIG. 4C is a cross-sectional view of a second embodiment of the first pixel PX1 taken along a line II-II' of FIG. 4A. Hereinafter, in order to avoid repetitive description, only the differences from the first, exemplary embodiment described above will be mainly described. In addition, it an element that functions substantially identically with a previously described element will be indicated by the same reference number.

Referring to FIGS. 4A and 4C, the first sub-pixel is disposed in the light emitting area EA of the first pixel PX1.

The first sub-pixel according to exemplary embodiments may include an insulating layer, a pixel definition layer PDL, a thin film transistor TFT, a light emitting element, and a cover layer CV disposed on the light emitting area EA in the substrate SUB. Herein, a thin film transistor TFT may include an active pattern ACT, a gate electrode GE, a source electrode SE, and a drain electrode DE. The insulating layer may include a buffer layer BF, a gate insulating layer GI, an interlayer insulating layer IL, and a passivation layer PSV. The light emitting element may include a first electrode EL1, a second electrode EL2, and an organic layer disposed between the first electrode EL1 and the second electrode EL2.

The insulating layer and the first electrode EL1 may be disposed on transmission area TA in the substrate SUB. More particularly, the buffer layer BF, the gate insulating layer GI, the interlayer insulating layer IL, the passivation layer PSV, and the first electrode EL1 may be sequentially stacked.

Each of the buffer layer BF, the gate insulating layer GI, the interlayer insulating layer IL, the passivation layer PSV, and first electrode EL1 may have a shape extending from the light emitting area EA.

In the pixel definition layer PDL, an opening is formed so that the first electrode EL1 corresponding to the light emitting area EA is exposed. Further, in the pixel definition layer PDL, an opening is formed so that the first electrode EL1 corresponding to the transmission area TA is exposed. A portion of the organic layer except for the emission layer EML may be sequentially disposed on the first electrode EL1 exposed in the transmission area TA. That is, at least one layer selected from the hole injection layer HIL, a hole transport layer HTL, an electron transport layer ETL, and an electron injection layer EIL may be disposed on the first electrode EL1 in the transmission area TA.

Since the organic layer does not include the emission layer EML emitting a light, the organic layer is entirely transparent. Therefore, light may pass through the organic layer.

Elements of each of the light emitting area EA and the transmission area TA may be formed by or in the same process. For example, in the case of forming the organic layer, the hole injection layer HIL except for the emission layer EML, the hole transport layer HTL, the electron transport layer ETL, and the electron injection layer EIL may be simultaneously formed in the light emitting area EA and the transmission area TA, and the emission layer EML may be only formed in the light emitting area EA.

Figure 5A:
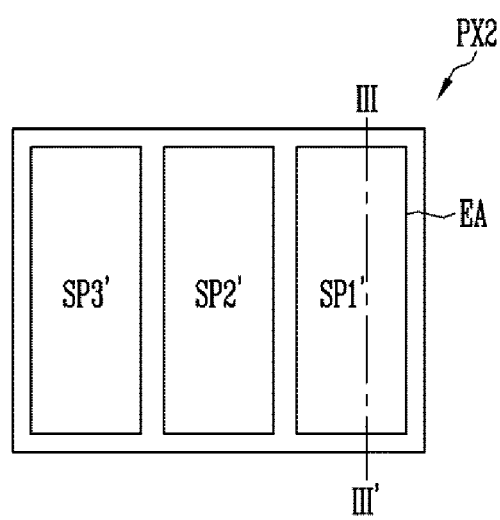
FIG. 5A is a plan view illustrating a second pixel in FIG. 3 rotated by 90 degree s from the position shown in FIG. 3.
Figure 5B:
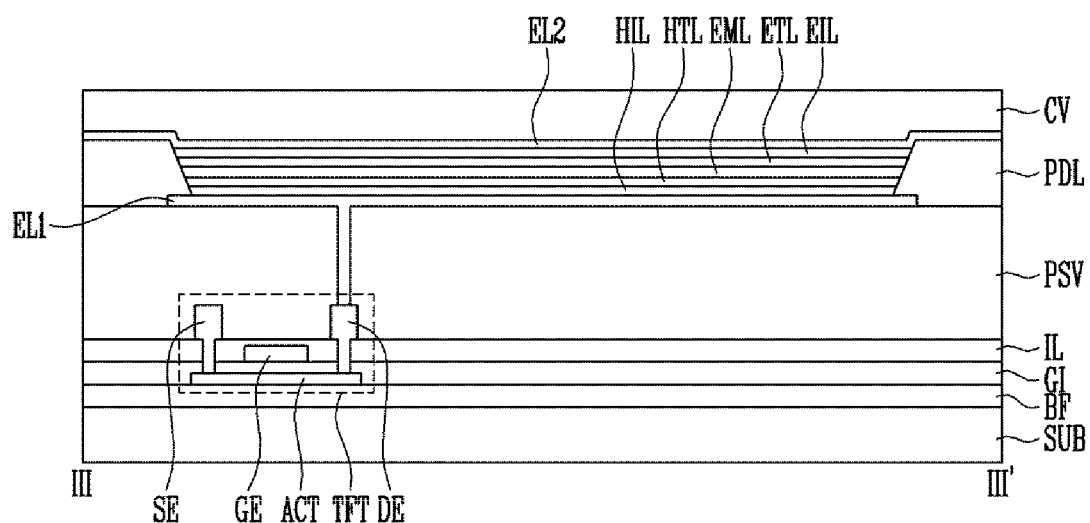
FIG. 5B is a cross-sectional view taken along a line III-III' of FIG. 5A.

FIG. 5A is a plan view illustrating a second pixel PX2 of FIG. 3 rotated by 90 degrees from the position shown in FIG. 3, and FIG. 5B is a cross-sectional view taken along a line of FIG. 5A.

Referring to FIGS. 5A and 5B, in the second pixel PX2, the light emitting area EA is provided, but the transmission area TA is not provided. The light emitting area EA may be provided in each of second pixels PX2, and three light emitting areas EA may be provided in one pixel in FIG. 5A.

In exemplary embodiments, three light emitting areas EA may be sequentially arranged in one direction (e.g., a horizontal direction in a drawing). However, the light emitting area EA may be disposed with various shapes and numbers. For example, the light emitting area EA may be arranged in other direction (e.g., a vertical direction) different from one direction illustrated. In exemplary embodiments, the light emitting area EA is illustrated as a quadrangle, but is not limited thereto, and may have various shapes such as a polygon, a circle, or the like.

Referring to FIG. 5A again, three second sub-pixels SP1', SP2', and SP3' may be provided in the light emitting area EA. The second sub-pixels may be provided in each of the light emitting area EA.

The second sub-pixel according to exemplary embodiments may include a buffer layer BF, a gate insulating layer GI, an interlayer insulating layer IL, a passivation layer PSV, a pixel definition layer PDL, a thin film transistor TFT, a light emitting element, and a cover layer CV disposed on the substrate SUB. Herein, a thin film transistor TFT may include an active pattern ACT, a gate electrode GE, a source electrode SE, and a drain electrode DE. The light emitting element may include a first electrode EL1, a second electrode EL2, and an organic layer disposed between the first electrode EL1 and the second electrode EL2. The organic layer may include a hole injection layer HIL, a hole transport layer HTL, an emission layer EML, an electron transport layer ETL, and an electron injection layer EIL.

The second sub-pixel has substantially the same structure as the first sub-pixel as shown in FIG. 4C except for the pixel definition layer PDL and the light emitting element. However, the second sub-pixel does not have a portion corresponding to the transmission area (TA; referring to FIG. 4C) unlike the first sub-pixel shown in FIG. 4C, and has a shape in which the light emitting area (EA; referring to FIG. 4C) extends. The size of the second sub-pixel may be larger than the size of the first sub-pixel. Even though the size of the first pixel PX1 is substantially the same as the size of the second pixel PX2, since the transmission area TA is disposed in the first pixel PX1, the size of the light emitting area EA of the first pixel PX1 is smaller than the size of the light emitting area EA of the second pixel PX2. Accordingly, the size of the first sub-pixel disposed in the light emitting area EA of the first pixel PX1 is smaller than the size of the second sub-pixel disposed in the light emitting area EA of the second pixel PX2.

In the second sub-pixel, the pixel definition layer PDL is disposed along an edge of the light emitting area EA, and the organic layer is disposed in the pixel definition layer PDL.

In the display device DP having a structure described above, the transmittance of light through the first area A1, in which the fingerprint sensor is disposed, is greater than the transmittance of light through the second area A2, in which the fingerprint sensor FPS is not disposed. Therefore, the fingerprint sensor FPS may easily sense a fingerprint of a user.

In exemplary embodiments, the case where a difference in light transmittance is realized by allowing the size of the sub-pixels in the first area A1 to be less than the size of the sub-pixels in the second area A2, has been described, but embodiments of the invention are not limited thereto. The difference in transmittance may be realized by other means known in the art, e.g., by modifying the wire structure, etc. in the first area A1 and the second area A2, in addition to or instead of the method described above. For example, the difference in transmittance between the first area A1 and the second area A2 may be realized by relatively narrowly forming the width of a wire in the first area A1 and relatively widely forming the width of the wire in the second area A2.

In addition, in exemplary embodiments, it is described that by removing a portion of the insulating layer, the light transmittance of the first area A1 is improved, but the invention is not limited thereto, and the difference of the transmittance may be realized other means known in the art, e.g., by controlling the thickness of each of the buffer layer BF, the gate insulating layer GI, the interlayer insulating layer IL, the passivation layer PSV and/or the cover layer CV in the first area A1 and the second area A2.

When there is a touch by a user in the first area A1, the display device DP having a structure described above may recognize a fingerprint of the user by using the fingerprint sensor FPS disposed in the rear surface of the substrate SUB. For example, in the case where the fingerprint sensor FPS is a photo sensor, since light passes through the transmission area TA of the first area A1, the fingerprint of the user may be sensed by sensing the light. In addition, in the case where the fingerprint sensor FPS is an ultrasonic sensor, since an ultrasonic wave passes through the transmission area TA of the first area A1, the fingerprint of the user may be sensed by sensing the ultrasonic wave.

The display device DP according to exemplary embodiments may further include other sensor elements to sense a touch position of a user in addition to the elements described above.

Figure 6:
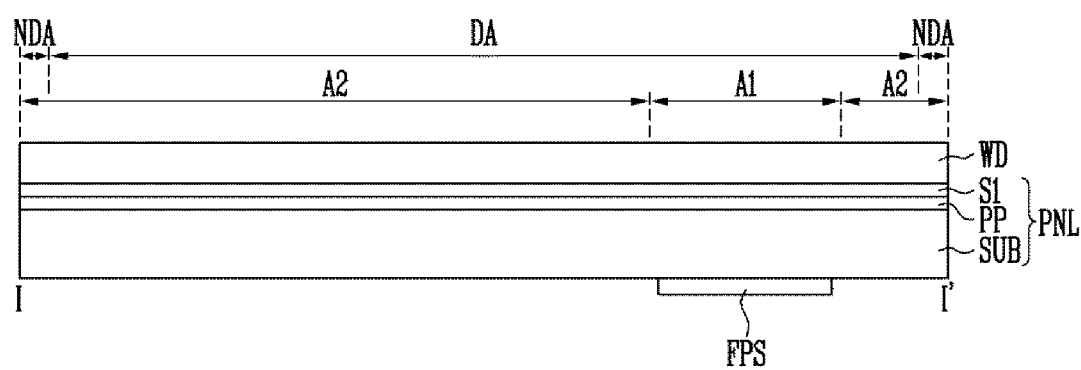
FIG. 6 is a cross-sectional view of an exemplary display device taken along a line corresponding to a line I-I' of FIG. 1.
Figure 7:
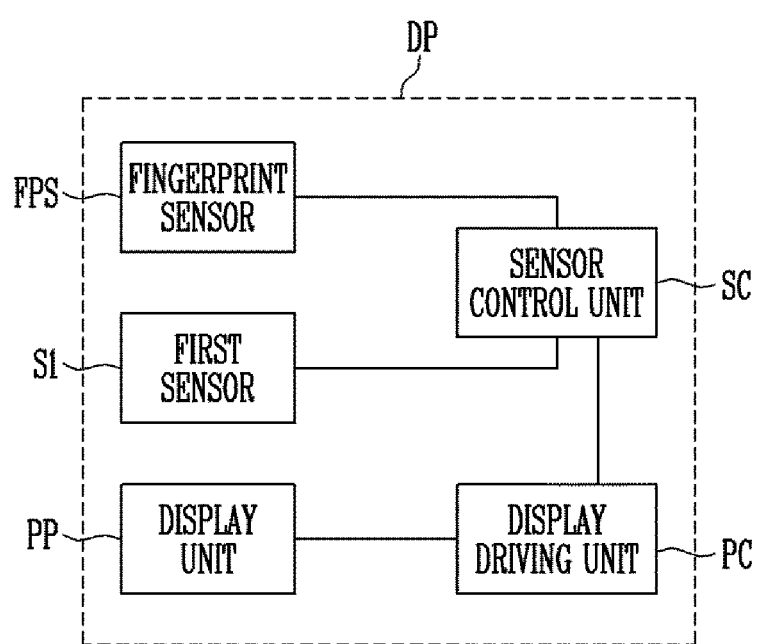
FIG. 7 is a block diagram graphically illustrating some of the components of an exemplary display device according to exemplary embodiments.

FIG. 6 is a cross-sectional view of an exemplary display device DP taken along a line corresponding to a line I-I' of FIG. 1. FIG. 7 is a block diagram graphically illustrating some of the components of an exemplary display device DP according to exemplary embodiments.

Referring to FIGS. 6 and 7, a display panel PNL of the display device DP according to exemplary embodiments includes a substrate SUB, a display unit PP disposed on the substrate SUB, a first sensor S1 disposed on the display unit PP, and the fingerprint sensor FPS disposed in a rear surface of the substrate SUB.

Since the substrate SUB, the display unit PP, and the fingerprint sensor FPS may be substantially the same as the exemplary embodiments described above, a detailed description thereof is omitted, and only the difference from the exemplary embodiments described above will be mainly described.

The first sensor S1 is a sensor for sensing a touch position when a user touches. The first sensor S1 may be a sensor of various types known in the art, for example, a capacitive type, a resistive type, or the like.

In exemplary embodiments, a sensor control unit SC may control an operation of the fingerprint sensor FPS and the first sensor S1. The sensor control unit SC may sense a variation of light in the fingerprint sensor FPS, thereby sensing the fingerprint of the user, and may sense capacitance, etc. of the first sensor S1, thereby sensing a touch position according to a touch of the user. In exemplary embodiments, the sensor control unit SC may simultaneously drive the fingerprint sensor FPS and the first sensor S1, or sequentially drive these sensors.

In exemplary embodiments, the first sensor S1 is described as being disposed on the display unit PP, but the invention is not limited thereto. The first sensor S1 may be disposed at other positions in addition to an upper of the display unit PP. For example, the first sensor may be disposed between the substrate SUB and the display unit PP, or may be disposed inside the display unit PP.

As shown in FIG. 6, in the case where the first sensor S1 is disposed inside the display panel PNL, the first sensor S1 may be integrated with the display panel PNL. Accordingly, an undesirable substrate SUB or layer may be removed, thereby reducing the thickness of the display device DP and manufacturing costs.

Figure 8A:
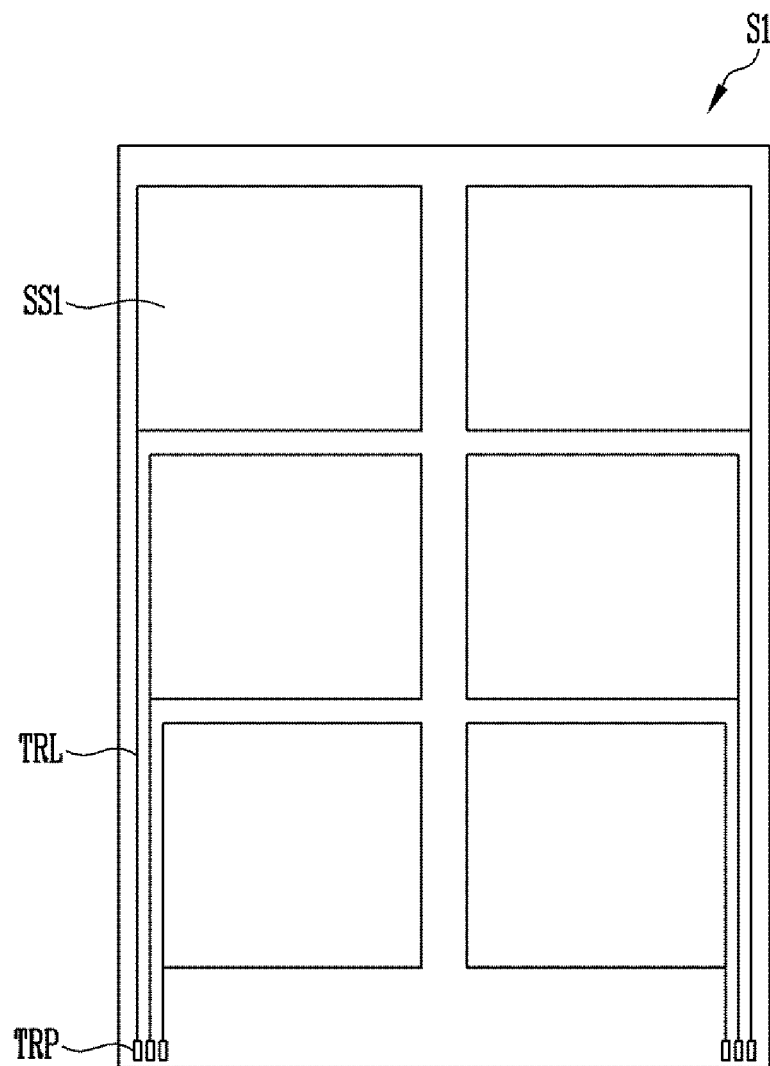
FIG. 8A illustrates an exemplary first sensor of a self-capacitance type that may be used in display devices of the invention.
Figure 8B:
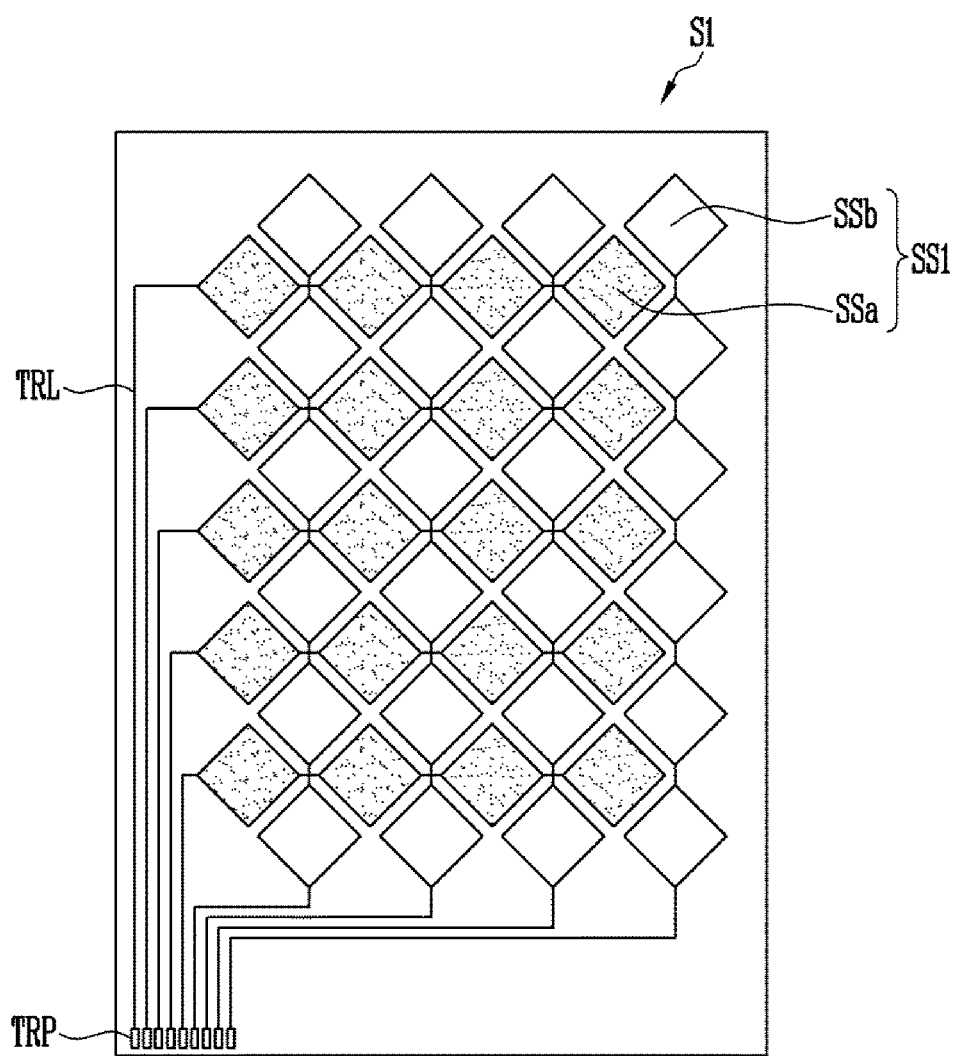
FIG. 8B illustrates an exemplary first sensor of a mutual-capacitance type that may be used in display devices of the invention.

FIG. 8A illustrates an exemplary first sensor of a self-capacitance type that may be used in display devices of the invention, and FIG. 8B illustrates an exemplary first sensor of a mutual-capacitance type that may be used in display devices of the invention.

Referring to FIG. 8A, the first sensor S1 according to exemplary embodiments may be a sensor of self-capacitance type.

The first sensor S1 according to exemplary embodiments may include a plurality of touch electrodes SS1, a plurality of wires TRL, and a plurality of pads TRP disposed in one ends of the wires TRL.

In exemplary embodiments, the touch electrodes SS1 are shown and described as having a rectangular shape, but the invention is not limited thereto. The touch electrodes SS1 may be varied into various shapes. For example, each of the touch electrodes SS1 has a circle shape. In addition, each of the touch electrodes SS1 may extend in one direction to be entirely a stripe shape.

In the case where the touch electrodes SS1 extends in the one direction, the extending direction may be variously changed into a long side direction of a substrate SUB, a short side direction thereof, a inclined direction thereof, or the like.

The touch electrodes SS1 may include a conductive material. For example, the conductive material may include a metal, an alloy thereof, a conductive polymer, a conductive metal oxide, or the like. In exemplary embodiments, the metal may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, lead, or the like. The conductive metal oxide may include indium tin oxide (ITO), indium zinc oxide (IZO), antimony zinc oxide (AZO), indium tin zinc oxide (ITZO), zinc oxide (ZnO), tin oxide ($SnO_2$), or the like. In exemplary embodiments, the touch electrodes SS1 are made of a single-layer or a multi-layer. The conductive polymer may include polythiophene compound, polypyrrole compound, polyaniline compound, polyacetylene compound, polyphenylene compound, and a mixture thereof, or the like, particularly PEDOT/PSS compound of polythiophene compound. Since the conductive polymer not only is easily manufactured, but also has higher flexibility than conductivity metal oxide, e.g., ITO, the probability of a crack occurring when bending may be decreased.

The touch electrodes SS1 and the wires TRL may be realized as a separate substrate SUB, or on various elements included in the display device DP. For example, the touch electrodes SS1 and the wires TRL may be formed on the display unit PP used in the display device DP.

In the case where the touch electrodes SS1 and the wires TRL are realized as the separate substrate SUB, the substrate SUB may be made of an insulating material such as glass, resin, or the like. In addition, the substrate SUB may be made of a flexible material to be bent or folded, and may have a single-layer structure or a multi-layer structure. For example, the substrate SUB may include at least one selected from polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material forming the substrate SUB may be variously changed, and the substrate SUB may be made of a glass fiber reinforced plastics (GFRP), or the like.

The wires TRL may be disposed between the touch electrodes SS1 and the pads TRP so as to connect the touch electrodes SS1 and the pads TRP each other. In addition, the wires TRL may be connected to the sensor control unit SC through the pads TRP. For example, the pads TRP may be connected to a sensor control unit SC through a separate wire, a flexible printed circuit substrate, a tape carrier package, a connector, a chip on film, or the like.

Since a self-capacitance of the touch electrodes SS1, which is associated with a touch, is varied when the touch is input in the first sensor S1, the sensor control unit SC may detect a touch position by using a signal output from the touch electrodes SS1.

Referring to FIG. 8B, the first sensor S1 according to exemplary embodiments may be a sensor of a mutual-capacitance type.

In addition, the first sensor S1 may include first touch electrodes SSa, second touch electrodes SSb, wires TRL, and pads TRP disposed at one ends of wires TRL.

The first touch electrodes SSa may be longitudinally formed in one direction and may be arranged in plural in the other direction intersecting the one direction. The second touch electrodes SSb are disposed to be spaced apart the first touch electrodes SSa, thereby functioning as a sensor of a mutual-capacitance type with the first touch electrodes SSa. For this purpose, the second touch electrodes SSb may be disposed so as to intersect with the first touch electrodes SSa. For example, the second touch electrodes SSb may be longitudinally formed in the other direction and may be arranged in plural in the one direction.

In exemplary embodiments, the first touch electrodes SSa and the second touch electrodes SSb are shown and described as having a diamond shape, but their shapes are not so limited and may be variously changed. For example, each of the first touch electrodes SSa and the second touch electrodes SSb may have a circle shape. In addition, each of the first touch electrodes SSa may have an elongated, stripe-type shape extending in one direction, each of the second touch electrodes SSb may have an elongated, stripe-type shape extending in other direction intersecting the first touch electrodes SSa.

Since the first touch electrodes SSa and the second touch electrodes SSb are disposed as described above, a mutual capacitance is formed between the first touch electrodes SSa and the second touch electrodes SSb, and the mutual capacitance associated with a touch is varied when the touch is input in the first sensor S1. In order to prevent a contact between the first touch electrodes SSa and the second touch electrodes SSb, an insulating layer is disposed between the first touch electrodes SSa and the second touch electrodes SSb. The insulating layer may be formed entirely between the first touch electrodes SSa and the second touch electrodes SSb, or may be formed only at each of cross-regions between the first touch electrodes SSa and the second touch electrodes SSb.

The first touch electrodes SSa and the second touch electrodes SSb may be made of a transparent conductive material, or of other conductive material such as an opaque metal, etc. For example, the first touch electrodes SSa and the second touch electrodes SSb may be formed of the same material as the touch electrode described above.

The first touch electrodes SSa and the second touch electrodes SSb are shown and described as having a rectangular shape in FIG. 8B, but the shape of the first touch electrodes SSa and the second touch electrodes SSb may be variously changed. In addition, the first touch electrodes SSa and the second touch electrodes SSb may have a mesh structure to add flexibility.

The wires TRL may be disposed between the touch electrodes SS1 and the pads TRP so as to connect the touch electrodes SS1 and the pads TRP to each other. In addition, the wires TRL may be connected to the sensor control unit SC through the pads TRP. For example, the pads TRP may be connected to a sensor control unit SC through a separate wire, a flexible printed circuit substrate, a tape carrier package, a connector, a chip on film, or the like.

The first touch electrodes SSa may receive a driving signal from the sensor control unit SC, and the second touch electrodes SSb may output a sensing signal applying a variation of a capacitance to the sensor control unit SC. Accordingly, the sensor control unit SC may detect a touch position by using a sensing signal output from the second touch electrodes SSb.

The display device DP according to exemplary embodiments may further include other sensor sensing a touch pressure of a user in addition to the elements described above.

Figure 9:
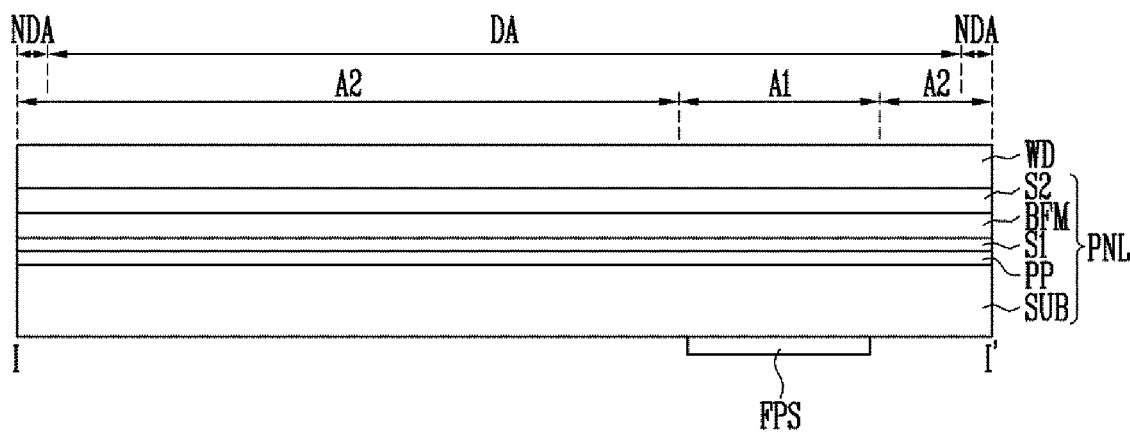
FIG. 9 is a cross-sectional view of another exemplary display device taken along a line corresponding to a line I-I' of FIG. 1.
Figure 10:
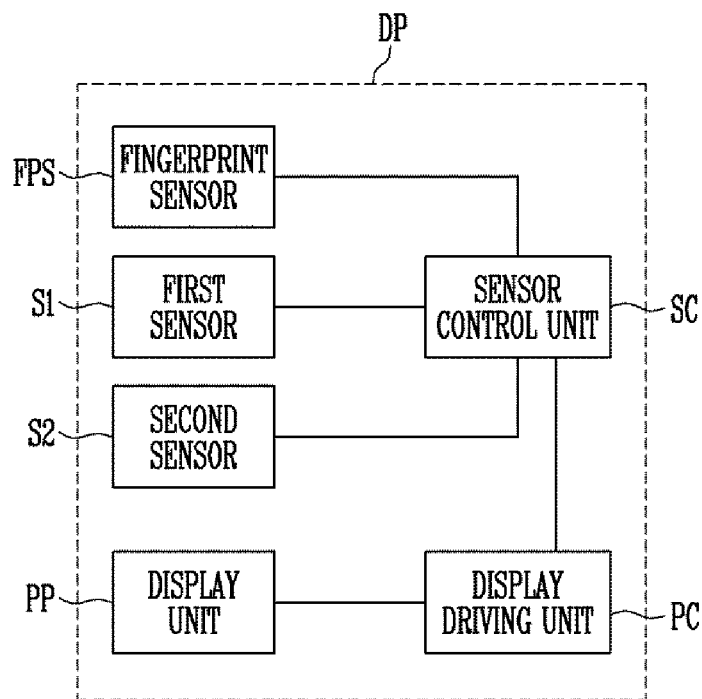
FIG. 10 is a block diagram graphically illustrating some of the components of an exemplary display device according to exemplary embodiments.

FIG. 9 is a cross-sectional view of another exemplary display device DP taken along a line corresponding to a line I-I' of FIG. 1. FIG. 10 is a block diagram graphically illustrating some of the components of an exemplary display device DP according to exemplary embodiments.

Referring to FIGS. 9 and 10, a display panel PNL of the display device DP according to exemplary embodiments includes a substrate SUB, a display unit PP disposed on a front surface of the substrate SUB, a first sensor S1 disposed on the display unit PP, a buffering member BFM disposed on the first sensor S1, a second sensor S2 disposed on the buffering member BFM, and the fingerprint sensor FPS disposed on a rear surface of the substrate SUB.

Since the substrate SUB, the display unit PP, the fingerprint sensor FPS, and the first sensor S1 may be substantially the same as the exemplary embodiments described above, detailed descriptions thereof are omitted, and only differences from the exemplary embodiments described above will be mainly described.

The second sensor S2 is a sensor for sensing a touch press when a user touches. The second sensor S2 may be a sensor of various types, for example, a sensor of a capacitive type sensing a capacitance between the first sensor S1 and the second sensor S2.

In exemplary embodiments, the type of the first sensor S1 and the second sensor S2 may be different from the type of the fingerprint sensor. For example, while the fingerprint sensor may be a sensor using light or an ultrasonic wave, or the first sensor S1 and the second sensor S2 may be a sensor sensing a capacitance variation. In addition, the sensing type of the first sensor S1 may be the same as or different from the sensing type of the second sensor S2.

For example, the first sensor S1 may be a sensor of a mutual-capacitance type, and the second sensor S2 may be a sensor of a mutual force sensor resistor (FSR). In exemplary embodiments, a case where the second sensor S2 is a capacitive type sensor sensing a capacitance between the first sensor S1 and the second sensor S2 will be described as an example.

A buffering member BFM may be disposed between the first sensor S1 and the second sensor S2. Thus, the buffering member BFM contacts the first sensor S1 and the second sensor S2.

The buffering member BFM may serve to buffer an external impact, and may have an elastic force for this purpose. For example, the buffering member BFM may be varied by an external pressure, and when the external pressure is removed, the buffering member BFM may have an elastic force being capable of restoring itself to its original state again.

In addition, the buffering member BFM may be formed of an insulation material to prevent an electric short between the first sensor S1 and the second sensor S2.

The buffering member BFM may be made of a porous polymer so as to have an elastic force. For example, the buffering member BFM may have foam shape like sponge. For example, the buffering member BFM may include thermoplastic elastomer, polystyrene, polyolefin, polyurethane thermoplastic elastomers, polyamides, synthetic rubbers, polydimethylsiloxane, polybutadiene, polyisobutylene, poly(styrene-butadienestyrene), polyurethanes, polychloroprene, polyethylene, silicone, etc. and compositions thereof, but is not limited thereto.

The buffering member BFM according to exemplary embodiments may be single or a plurality of divided shapes. That is, the buffering members may be divided from each other and may have various shapes.

In exemplary embodiments, the case where the buffering member BFM is formed has been described, but the inventive embodiments are not limited thereto. For example, an air layer may be formed instead of the buffering member BFM.

According to exemplary embodiments, the sensor control unit SC may control an operation of the fingerprint sensor FPS, the first sensor S1, and the second sensor S2. The sensor control unit SC may sense light variation of the fingerprint sensor FPS, thereby sensing a fingerprint of a user, and may sense a capacitance, etc. of the first sensor S1, thereby sensing a touch position based on a user touch. In addition, the sensor control unit SC may sense a capacitance, etc. of the second sensor S2, thereby sensing a touch pressure based on the user touch.

According to exemplary embodiments, the sensor control unit SC may simultaneously drive or sequentially drive the operation of the fingerprint sensor FPS, the first sensor S1, and the second sensor S2.

When the second sensor S2 is pressed by the touch of a user, etc., the thickness of the buffering member BFM between the first sensor S1 and the second sensor S2 may vary. Thus, the capacitance between the first sensor S1 and the second sensor S2 may vary. Therefore, the intensity of a pressure may be detected by using a capacitance variation of the second sensor S2.

The pressure applied to the second sensor S2 may be mainly generated by the touch of the user, but is not limited thereto, and may be generated by other various means known in the art.

The sensor control unit SC may sense capacitance variation between the first sensor S1 and the second sensor S2, thereby detecting a pressure applied to the second sensor S2.

As shown in FIG. 9, in the case that the first sensor S1 and the second sensor S2 are disposed inside the display panel PNL, the first sensor S1 and the second sensor S2 may be integrated with the display panel PNL. Accordingly, an undesirable substrate SUB or layer may be removed, thereby reducing a thickness of the display device DP and a manufacturing cost.

Figure 11A:
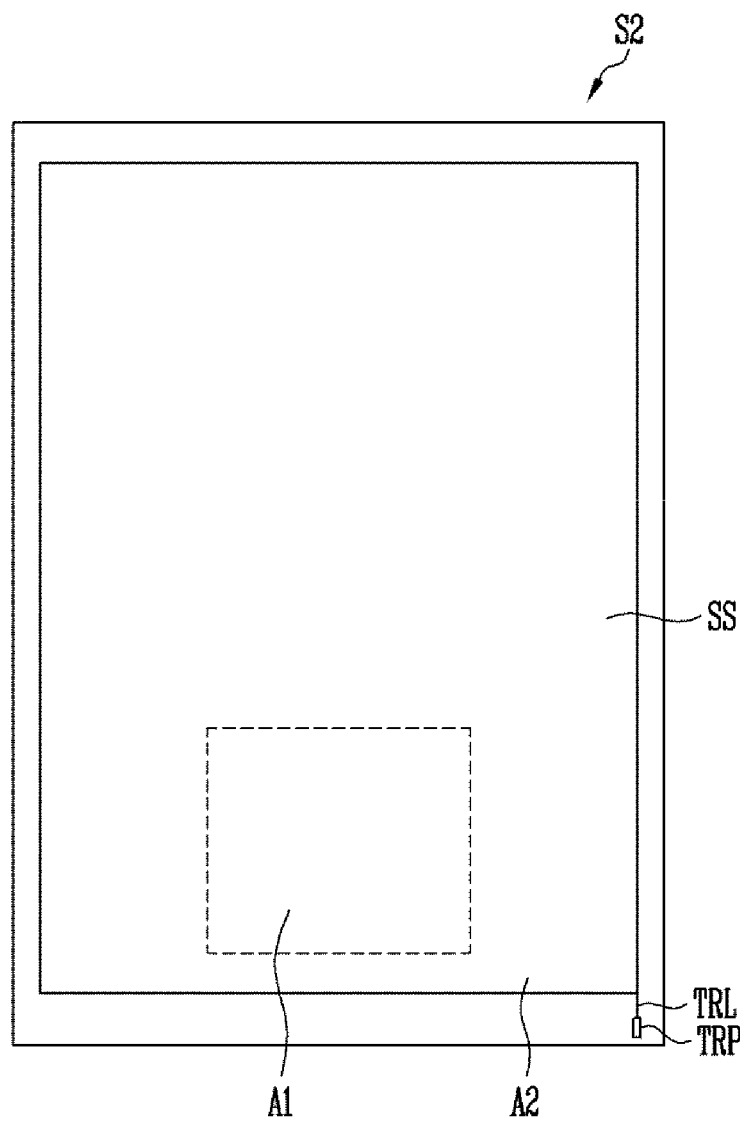
Figure 11C:
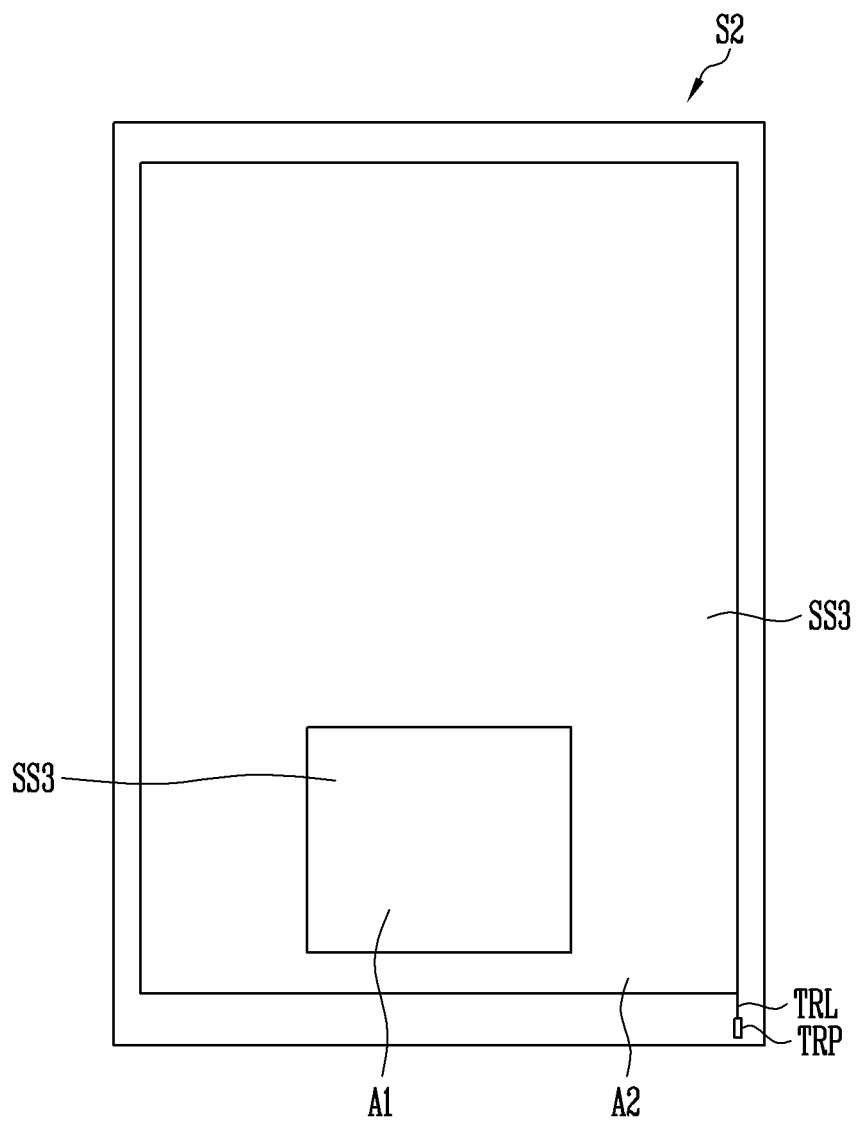

FIGS. 11A to 11C are plan views illustrating a second sensor S2 according to exemplary embodiments.

Referring to FIG. 11A, the second sensor S2 according to exemplary embodiments may include a touch electrode SS, a wire TRL, and pad TRP disposed in one end of the wire TRL The touch electrode SS may cover all or most of the first area A1 and the second area A2 and be formed as an inseparable integral shape, e.g., a planar shape.

In exemplary embodiments, an identification pattern may be disposed in the first area A1 or in a portion adjacent to the first area A1 in the second area A2 so that the position of a fingerprint sensing area, i.e., the first area A1 is recognized to a user. The identification pattern functions effectively as long as the user may identify the first area A1, and the shape or position thereof is not so limited. For example, the identification pattern may be disposed along an edge of the first area A1, and the identification pattern may be formed as a black matrix. In exemplary embodiments, when the identification pattern is formed as a black matrix, the identification pattern may be formed with another black matrix, which shields light in other area, in a rear surface of a window.

The touch electrode SS may include a conductive material. For example, the conductive material may include a metal, an alloy thereof, a conductive polymer, a conductive metal oxide, or the like. In exemplary embodiments, the metal may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, lead, or the like. The conductive metal oxide may include indium tin oxide (ITO), indium zinc oxide (IZO), antimony zinc oxide (AZO), indium tin zinc oxide (ITZO), zinc oxide (ZnO), tin oxide ($SnO_2$), or the like. In exemplary embodiments, the touch electrodes SS1 are made of a single-layer or a multi-layer.

In exemplary embodiments, the conductive polymer may include polythiophene compound, polypyrrole compound, polyaniline compound, polyacetylene compound, polyphenylene compound, and a mixture thereof, or the like, particularly PEDOT/PSS compound of polythiophene compound. The conductive polymer may be easily manufactured by using wet-coating, and may be particularly manufactured by using a roll-to-roll method.

Since the conductive polymer has higher flexibility than conductivity metal oxide, e.g., ITO, a probability of a crack may be decreased when bending.

Particularly, the PEDOT/PSS compound may have a relatively lower resistance and a relatively higher light transmittance. In addition, since the conductive polymer has a refractive index similar to that of the substrate SUB or an adhesive, the relative light loss may be small. In exemplary embodiments, since the sheet resistance and the light transmittance of a layer, which is made of PEDOT/PSS, may have substantially the same as the sheet resistance and the light transmittance a conductive layer made of indium-tin-oxide respectively, the layer may have a sheet resistance of about 100 W/sq to about 300 W/sq, preferably 150 W/sq and a light transmittance of more than about 80%, preferably more than about 88%. In addition, PEDOT/PSS may have a haze of 0.4% and a light loss rate of about 4.1%.

The wire TRL may be disposed between the touch electrode SS and the pad TRP so to connect the touch electrode SS and the pad TRP to each other. In addition, the wire TRL may be connected to the sensor control unit SC through the pad TRP. For example, the pad TRP may be connected to a sensor control unit SC through a separate wire, a flexible printed circuit substrate, a tape carrier package, a connector, a chip on film, or the like.

In exemplary embodiments, the touch electrode SS of the second sensor S2 may have various shapes.

Referring to FIG. 11B, the second sensor S2 according to exemplary embodiments may be formed from a plurality of touch electrodes SS2 in a similar manner as a touch sensor of a self-capacitance type. That is, the second sensor S2 may include a plurality of touch electrodes SS2, a plurality of wires TRL, and a plurality of pads TRP disposed in one ends of the wires TRL.

In exemplary embodiments, the second sensor S2 may include the plurality of touch electrodes SS2, thereby sensing pressure of a multi-touch as well as a single-touch.

The second sensor S2 may have a structure capable of sensing a single capacitance variation or a plurality of capacitance variations with the first sensor S1, but the configuration of the second sensor S2 is not limited thereto. For example, the second sensor S2 may have a shape similar to that of a mutual-capacitance type touch sensor.

Referring to FIG. 11C, the second sensor S2 according to exemplary embodiments may be similar to that of FIG. 11A, but the touch electrode SS3 may be divided into one portion in the first area A1 and the other portion in the second area A2. An identification pattern may be disposed in a portion of the first area A1 and the second area A2 separated from each other, for example, in the first area A1 or in a portion of the second area A2 adjacent to the first area A1 so that the position of a fingerprint sensing area, i.e., the first area A1 is recognized by a user. The identification pattern functions effectively as long as the user may identify the first area A1, but the shape or position thereof is not so limited. For example, the identification pattern may be disposed along an edge of the first area A1, and the identification pattern may be formed as a black matrix.

The touch electrode SS3 of the first area A1 and the segregated second area A2 may be electrically connected to each other through a separate wire, etc. Alternatively, each of the touch electrodes SS3 of the first area A1 and the segregated second area A2 may be connected to the sensor control unit SC through a separate wire, etc.

The display device DP according to exemplary embodiments may sense a fingerprint, a touch position, and/or a touch pressure in various ways by using the fingerprint sensor FPS, the first sensor S1, and the second sensor S2.

Figure 12:
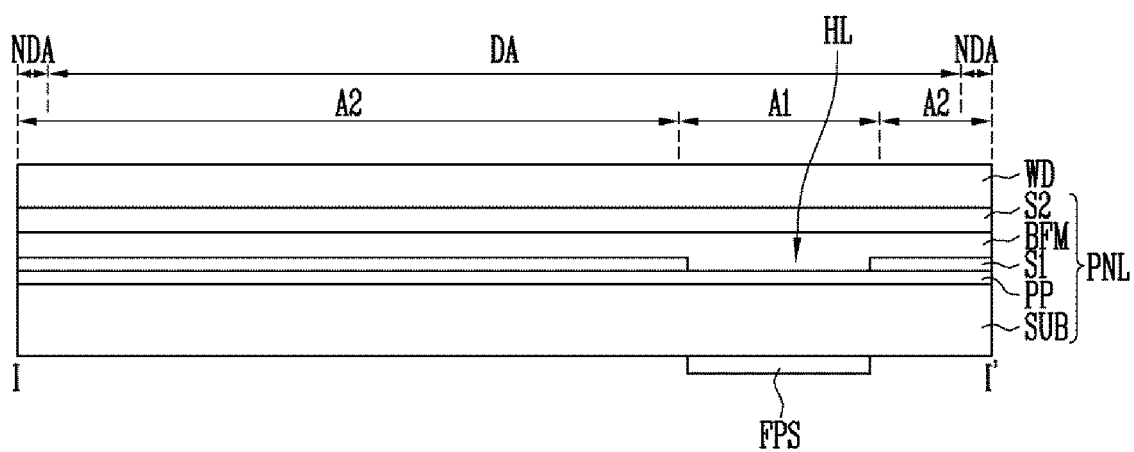
FIG. 12 is a cross-sectional view of another exemplary display device taken along a line corresponding to a line I-I' of FIG. 1.
Figure 13:
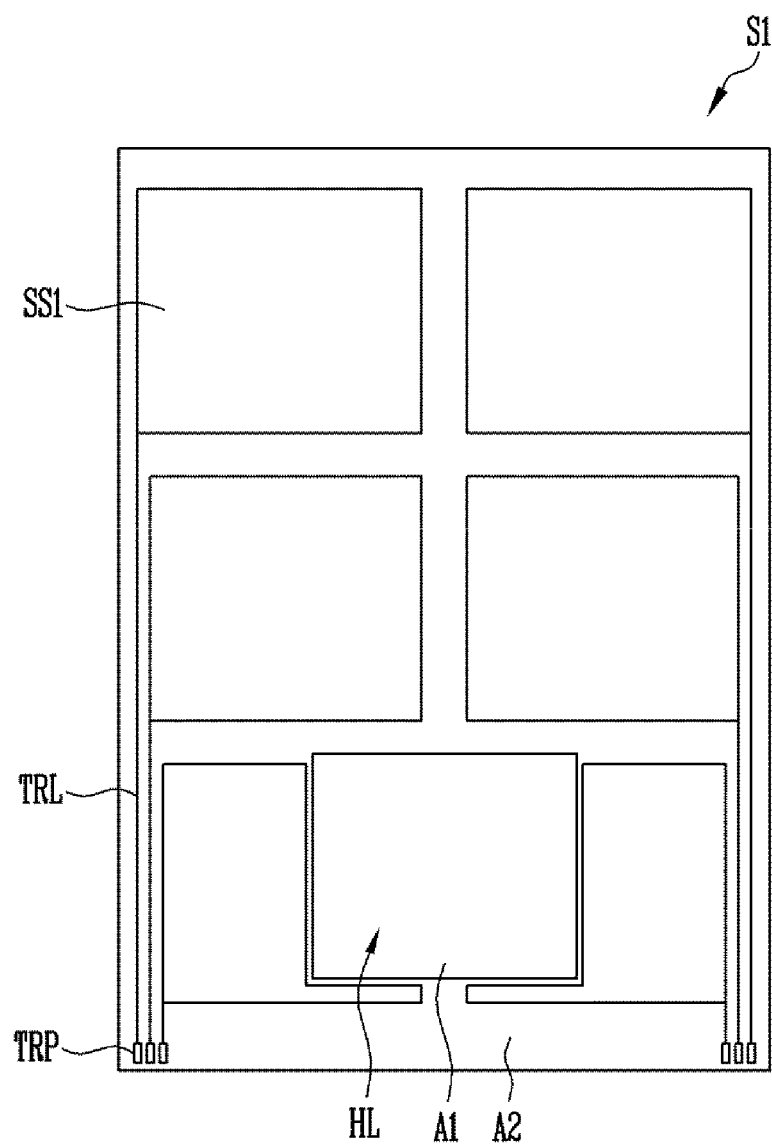
FIG. 13 is a plan view illustrating a first sensor in the display device of FIG. 12.

FIG. 12 is a cross-sectional view of another exemplary display device DP taken along a line corresponding to a line I-I' of FIG. 1. FIG. 13 is a plan view illustrating a first sensor S1 in the display device of FIG. 12.

A display panel PNL of the display device DP according to exemplary embodiments includes a substrate SUB, a display unit PP disposed on a front surface of the substrate SUB, a first sensor S1 disposed on the display unit PP, a buffering member BFM disposed on the first sensor S1, a second sensor S2 disposed on the buffering member BFM, and the fingerprint sensor FPS disposed on a rear surface of the substrate SUB.

Since the substrate SUB, the display unit PP, the fingerprint sensor FPS, and the second sensor S2 may be substantially the same as the exemplary embodiments described above, detailed descriptions thereof are omitted, and the differences from the exemplary embodiments described above will be mainly described.

In exemplary embodiments, the first sensor S1 may be described as a sensor of a self-capacitance type for convenience of description, but is not limited thereto and the first sensor S1 may be a sensor of various types. For example, the first sensor S1 may be a sensor of a mutual-capacitance type.

In exemplary embodiments, the first sensor S1 may be substantially disposed only in the second area A2 of the first area A1 and the second area A2. In the first sensor S1, the first area A1 has a hole HL, and the first sensor S1 is not disposed in the hole HL. That is, the touch electrodes SS1 of the first sensor S1 are not formed in the hole HL of the first area A1.

According to exemplary embodiments, in the first area A1, the fingerprint sensor FPS may be used as the touch position sensor, and the second sensor S2 defines a capacitance with a conductor disposed in the fingerprint sensor FPS, thereby sensing a pressure. In other words, a fingerprint of a user may be recognized by using the fingerprint sensor disposed in the first area A1, but a touch position and a touch pressure may be recognized by using different sensors in the first area A1 and the second area A2. That is, in the first area A1, the touch position may be sensed by using the fingerprint sensor FPS, and the touch pressure may be sensed by using the fingerprint sensor FPS and the second sensor S2. In the second area A2, the touch position may be sensed by using the first sensor S1, and the touch pressure may be sensed by using the first sensor S1 and the second sensor S2.

In the display device DP according to exemplary embodiments described above, at least a portion of the display device DP may have flexibility or not have flexibility. Elements including in the display device DP, for example, the display panel PNL or the window WD may also separately have flexibility so that the display device DP may have flexibility. For example, the display device DP may include a flexible area having flexibility and/or a rigid area having no flexibility depending on a degree of flexibility. In the case where the display device DP has flexibility, the display device DP may be folded. If a virtual line over which the display device DP is folded is called as a folding line, the folding line may be disposed in the flexible area.

Herein, the term "may be folded" does not necessarily mean a general folded state of an object and is not limited to a fixed form; rather, it may include a state in which a certain form may change into another form. For example, "may be folded" may refer to being folded, bended, curved, or rolled along at least one predetermined line, that is, the folding line. Therefore, the display device DP may have flexibility, even if it may be not folded or may be actually folded in the flexible area.

Herein, in the flexible area and the rigid area, the terms as "having flexibility" or "not having flexibility" and "flexible" or "rigid" are expressions relatively showing properties of the display device DP. More specifically, the expressions "not having flexibility" and "rigid" refer to not only those instances where a material does not have flexibility at all and thus is hard, but also to those instances where a material has flexibility that is less than that of the flexible area. Accordingly, the rigid area may have relatively small flexibility compared to the flexible area or may not have any flexibility. Even upon a condition that the flexible area is folded, the rigid area may not be folded.

In exemplary embodiments, the folding line, the flexible area, or the rigid area may be variously changed. For example, the display device DP may include both the flexible area and the rigid area, but may include only the flexible except the rigid area. In addition, single or plural folding lines may be provided. If necessary, the folding line may be provided in various positions along the display, and in this case, the display device DP may be entirely rolled.

Figure 14:
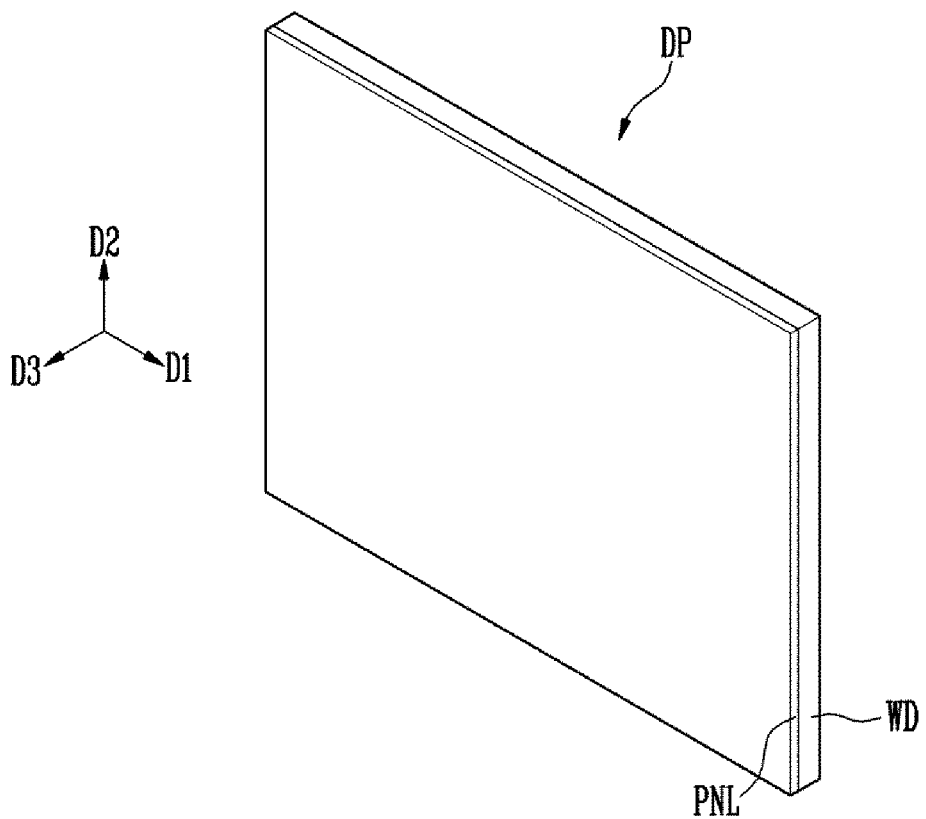
FIG. 14 is a perspective view illustrating a display device constructed according to the principles of the invention.
Figure 15A:
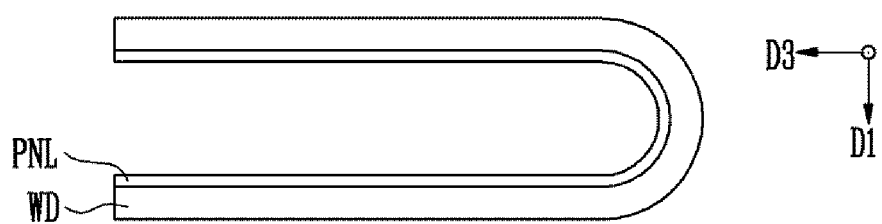
FIG. 15A is a cross-sectional view illustrating the display device of FIG. 14 in a folded position.
Figure 15B:
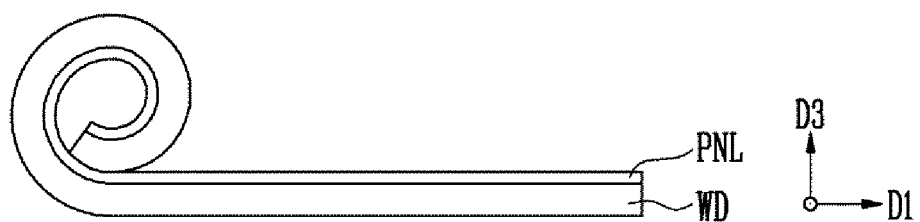
FIG. 15B is a cross-sectional view illustrating the display device of FIG. 14 in a rolled position.

FIG. 14 is a perspective view illustrating a display device DP constructed according to the principles of the invention, FIG. 15A is a cross-sectional view illustrating the display device DP of FIG. 14 in a folded position, and FIG. 15B is a cross-sectional view illustrating the display device DP of FIG. 14 in a rolled position.

As shown in FIG. 14, the display device DP may be formed as a flat shape, but at least a portion of the display device DP may vary, thereby being formed as other shape.

Referring to FIGS. 15A and 15B together with FIG. 14, at least a portion of the display device DP in exemplary embodiments may have flexibility, or the entire display device DP may have flexibility.

Since the display device DP has flexibility, the display device DP is folded as shown in FIG. 14A or is rolled as shown in FIG. 14B in a flexible area.

The folding line, in which the display device DP is folded, may pass through a center portion of the display device DP and may be parallel with the second direction D2. However, the position of the folding line is not limited thereto. The folding line may be disposed in a direction parallel with the first direction D1 and may be disposed in an inclined direction with reference to the first direction D1 or the second direction D2. In addition, it is needless to say that the folding line need not pass through the center of the display device DP. Further, when being folded about the folding line, the display device DP may be folded so that a front surface displaying an image becomes an inner side or an outer side. Alternatively, when the display device DP is folded about a plurality of folding lines, one portion thereof may be folded so that the front surface becomes the inner side and other portion thereof may be folded so that the front surface becomes the outer side.

Reference number D3 means a third direction perpendicular to each of the first direction and the second direction.

The display device DP may be rolled so that one side faces other side. A rolling direction of the display device DP may be the first direction D1 or the second direction D2. However, the rolling direction is not limited thereto and may be an inclined direction with reference to the first direction D1 or the second direction D2. In addition, in the display device DP, a rolling area may be a portion of the display device DP, and an entire area thereof may be also rolled.

As described above, exemplary embodiments of the invention provide a display device capable of enhancing a security function by including a fingerprint sensor having improved sensitivity. Further, exemplary embodiments provide a high-quality display device in which resolution of the area including the fingerprint sensor is substantially the same as resolution of an area not including the fingerprint sensor.

In addition, exemplary embodiments provide a display device which is capable of sensing a touch position and a touch pressure while also sensing the fingerprint, whereby enhancing a convenience of use.

The display device according to exemplary embodiments may be applied to various electronic devices. For example, the display device may be applied to various wearable devices such as a television, a laptop, a mobile phone, a smart phone, a smart pad, a PMP, a PDA, a navigation system, a smart watch, etc.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device comprising:
    a substrate including, in a plan view, a first area having a first light transmittance and a second area adjacent to the first area with a second light transmittance;
    a plurality of pixels disposed on the substrate to display an image;
    a photo sensor disposed in the first area below the substrate;
    an insulating layer on the substrate;
    a pixel defining layer on the substrate; and
    a passivation layer on the substrate,
    wherein the first light transmittance is greater than the second light transmittance,
    wherein the first area includes a light emitting area having a first size and a light transmission area having a second size through which light is transmitted, the light transmission area being different from the light emitting area,
    wherein the first size is smaller than the second size to improve sensitivity of the photo sensor, wherein the plurality of pixels include at least one first pixel in the first area and a second pixel in the second area, wherein the first pixel includes the light emitting area and the light transmission area, wherein the first pixel includes at least one first sub-pixel disposed in the light emitting area, wherein the first sub-pixel comprises:
a first electrode disposed on the substrate;
an emission layer disposed on the first electrode; and
a second electrode disposed on the emission layer, wherein the insulating layer is disposed between the substrate and the first electrode, wherein the insulating layer extends into the light transmission area, wherein the insulating layer overlaps the pixel defining layer and the passivation layer in the light transmission area in a plan view, wherein the first sub-pixel further includes at least one structure selected from the group of a hole injection layer, a hole transport layer, an electron transport layer, and an electron injection layer, the at least one structure being disposed between the first electrode and the second electrode, and wherein the at least one structure extends across the light transmission area.

2. The display device of claim 1, wherein the second pixel includes at least one second sub-pixel, and
wherein each of the first sub-pixel and the second sub-pixel emits one wavelength of light selected from the group of red light, green light, and blue light.

3. The display device of claim 2, wherein a size of the first pixel is substantially the same as a size of the second pixel.

4. The display device of claim 1, wherein the second pixel includes at least one second sub-pixel, and
wherein a size of the first sub-pixel is smaller than a size of the second sub-pixel.

5. The display device of claim 1, further comprising a first sensor disposed above the substrate to sense a touch position input by a user,
wherein the first sensor is a touch sensor of a self-capacitance type or a touch sensor of a mutual-capacitance type,
wherein the first sensor includes:
a first touch electrode; and
a second touch electrode spaced apart from the first touch electrode and forming a capacitance with the first touch electrode, and
wherein a portion of the first and second touch electrodes does not overlap the first area in the plan view.

6. A display device comprising:
a substrate including, in a plan view, a first area having a first light transmittance and a second area adjacent to the first area with a second light transmittance;
a plurality of pixels disposed on the substrate to display an image;
an insulating layer on the substrate;
a pixel defining layer on the substrate; and
a passivation layer on the substrate,
wherein the first light transmittance is greater than the second light transmittance,
wherein the first area includes a light emitting area having a first size and a light transmission area having a second size through which light is transmitted, the light transmission area being different from the light emitting area, wherein the first size is smaller than the second size,
wherein the plurality of pixels include at least one first pixel in the first area and a second pixel in the second area, wherein the first pixel includes the light emitting area and the light transmission area, wherein the first pixel includes at least one first sub-pixel disposed in the light emitting area, wherein the first sub-pixel comprises:
a first electrode disposed on the substrate;
an emission layer disposed on the first electrode; and
a second electrode disposed on the emission layer, wherein the insulating layer is disposed between the substrate and the first electrode, wherein the insulating layer extends into the light transmission area, wherein the insulating layer overlaps the pixel defining layer and the passivation layer in the light transmission area in a plan view, wherein the first sub-pixel further includes at least one structure selected from the group of a hole injection layer, a hole transport layer, an electron transport layer, and an electron injection layer, the at least one structure being disposed between the first electrode and the second electrode, and wherein the at least one structure extends across the light transmission area.

7. The display device of claim 6, wherein the second pixel includes at least one second sub-pixel, and
wherein each of the first sub-pixel and the second sub-pixel emits one wavelength of light selected from the group of red light, green light, and blue light.

8. The display device of claim 7, wherein a size of the first pixel is substantially the same as a size of the second pixel.

9. The display device of claim 7, further comprising a photo sensor disposed in the first area below the substrate.

10. The display device of claim 6, wherein the second sub-pixel includes at least one second sub-pixel, and
wherein a size of the first sub-pixel is smaller than a size of the second sub-pixel.

11. The display device of claim 6, further comprising a first sensor disposed above the substrate to sense a touch position input by a user,
wherein the first sensor is a touch sensor of a self-capacitance type or a touch sensor of a mutual-capacitance type,
wherein the first sensor includes:
a first touch electrode; and
a second touch electrode spaced apart from the first touch electrode and forming a capacitance with the first touch electrode, and
wherein a portion of the first and second touch electrodes does not overlap the first area in the plan view.

12. A display device comprising:
a substrate including, in a plan view, a first area having a first light transmittance and a second area adjacent to the first area with a second light transmittance;
a plurality of pixels disposed on the substrate to display an image;
a plurality of thin film transistors disposed on the substrate, each of the plurality of thin film transistors comprising an active layer, a gate electrode, a source electrode, and a drain electrode;
a photo sensor disposed in the first area below the substrate;
an insulating layer on the substrate;
a pixel defining layer on the substrate; and a passivation layer on the substrate,
wherein the first light transmittance is greater than the second light transmittance,
wherein the first area includes a light emitting area having a first size and a light transmission area having a second size through which light is transmitted, the light transmission area being different from the light emitting area,
wherein the first size is smaller than the second size to improve sensitivity of the photo sensor,
wherein the plurality of pixels include at least one first pixel in the first area and a second pixel in the second area,
wherein the first pixel includes the light emitting area and the light transmission area,
wherein the first pixel includes at least one first sub-pixel disposed in the light emitting area,
wherein the first sub-pixel comprises:
a first electrode disposed on the substrate;
an emission layer disposed on the first electrode; and
a second electrode disposed on the emission layer,
wherein the insulating layer is disposed between the active layer and the first electrode,
wherein the first sub-pixel further includes at least one structure selected from the group of a hole injection layer, a hole transport layer, an electron transport layer, and an electron injection layer, the at least one structure being disposed between the first electrode and the second electrode,
wherein the at least one structure extends across the light transmission area, and
wherein a portion of the insulating layer is not disposed in the light transmission area in the first area.

13. The display device of claim 12, wherein the second pixel includes at least one second sub-pixel, and
wherein each of the first sub-pixel and the second sub-pixel emits one wavelength of light selected from the group of red light, green light, and blue light.

14. The display device of claim 13, wherein
a size of the first sub-pixel is smaller than a size of the second sub-pixel.

15. The display device of claim 14, further comprising a first sensor disposed on the substrate to sense a touch position input by a user,
wherein the first sensor is a touch sensor of a self-capacitance type or a touch sensor of a mutual-capacitance type,
wherein the first sensor includes:
a first touch electrode; and
a second touch electrode spaced apart from the first touch electrode and forming a capacitance with the first touch electrode, and
wherein each of the first touch electrode and the second touch electrode comprises a mesh structure.

16. The display device of claim 15, wherein a portion of the first sensor and the first area are not overlapped in the plan view.

17. A display device comprising:
a substrate including, in a plan view, a first area having a first light transmittance and a second area adjacent to the first area with a second light transmittance;
a plurality of pixels disposed on the substrate to display an image;
a plurality of thin film transistors disposed on the substrate, each of the plurality of thin film transistors comprising an active layer, a gate electrode, a source electrode, and a drain electrode;
a photo sensor disposed in the first area below the substrate;
an insulating layer on the substrate;
a pixel defining layer on the substrate; and
a passivation layer on the substrate,
wherein the first light transmittance is greater than the second light transmittance,
wherein the first area includes a light emitting area having a first size and a light transmission area having a second size through which light is transmitted, the light transmission area being different from the light emitting area,
wherein the first size is smaller than the second size to improve sensitivity of the photo sensor,
wherein the plurality of pixels include at least one first pixel in the first area and a second pixel in the second area,
wherein the first pixel includes the light emitting area and the light transmission area,
wherein the at least one first pixel includes at least one first sub-pixel disposed in the light emitting area,
wherein the first sub-pixel comprises:
a first electrode disposed on the substrate;
an emission layer disposed on the first electrode; and
a second electrode disposed on the emission layer,
wherein the insulating layer is disposed between the active layer and the first electrode,
wherein the passivation layer is disposed between the source electrode or the drain electrode and the first electrode,
wherein the first sub-pixel further includes at least one structure selected from the group of a hole injection layer, a hole transport layer, an electron transport layer, and an electron injection layer, the at least one structure being disposed between the first electrode and the second electrode,
wherein the at least one structure extends across the light transmission area,
wherein a portion of the insulating layer is not disposed in the light transmission area in the first area, and
wherein a portion of the passivation layer is not disposed in the light transmission area in the first area.

18. The display device of claim 17, wherein the second pixel includes at least one second sub-pixel, and
wherein each of the first sub-pixel and the second sub-pixel emits one wavelength of light selected from the group of red light, green light, and blue light.

19. The display device of claim 18,
wherein a size of the first sub-pixel is smaller than a size of the second sub-pixel.

20. The display device of claim 17, further comprising a first sensor disposed on the substrate to sense a touch position input by a user,
wherein the first sensor is a touch sensor of a self-capacitance type or a touch sensor of a mutual-capacitance type,
wherein the first sensor includes:
a first touch electrode; and
a second touch electrode spaced apart from the first touch electrode and forming a capacitance with the first touch electrode, and
wherein each of the first touch electrode and the second touch electrode comprises a mesh structure.

21. The display device of claim 17, wherein a portion of the second electrode is not disposed in the light transmission area in the first area.

22. A display device comprising:
a substrate including, in a plan view, a first area having a first light transmittance and a second area adjacent to the first area with a second light transmittance;
a plurality of pixels disposed on the substrate to display an image;
a plurality of thin film transistors disposed on the substrate, each of the plurality of thin film transistors comprising an active layer, a gate electrode, a source electrode, and a drain electrode;
an insulating layer on the substrate;
a pixel defining layer on the substrate; and
a passivation layer on the substrate,
wherein the first light transmittance is greater than the second light transmittance,
wherein the first area includes a light emitting area having a first size and a light transmission area having a second size through which light is transmitted, the light transmission area being different from the light emitting area,
wherein the first size is smaller than the second size,
wherein the plurality of pixels include at least one first pixel in the first area and a second pixel in the second area,
wherein the first pixel includes the light emitting area and the light transmission area,
wherein the first pixel includes at least one first sub-pixel disposed in the light emitting area,
wherein the first sub-pixel comprises:
a first electrode disposed on the substrate;
an emission layer disposed on the first electrode; and
a second electrode disposed on the emission layer,
wherein the insulating layer is disposed between the active layer and the first electrode,
wherein the passivation layer is disposed between the source electrode or the drain electrode and the first electrode,
wherein the first sub-pixel further includes at least one structure selected from the group of a hole injection layer, a hole transport layer, an electron transport layer, and an electron injection layer, the at least one structure being disposed between the first electrode and the second electrode,
wherein the at least one structure extends across the light transmission area,
wherein a portion of the insulating layer is not disposed in the light transmission area in the first area, and
wherein a portion of the passivation layer is not disposed in the light transmission area in the first area.

23. The display device of claim 22, wherein the second pixel includes at least one second sub-pixel, and
wherein each of the first sub-pixel and the second sub-pixel emits one wavelength of light selected from the group of red light, green light, and blue light.

24. The display device of claim 23,
wherein a size of the first sub-pixel is smaller than a size of the second sub-pixel.

25. The display device of claim 24, further comprising a first sensor disposed on the substrate to sense a touch position input by a user,
wherein the first sensor is a touch sensor of a self-capacitance type or a touch sensor of a mutual-capacitance type,
wherein the first sensor includes:
a first touch electrode; and
a second touch electrode spaced apart from the first touch electrode and forming a capacitance with the first touch electrode, and
wherein each of the first touch electrode and the second touch electrode comprises a mesh structure.

26. The display device of claim 22, wherein a portion of the second electrode is not disposed in the light transmission area in the first area.

27. A display device comprising:
a substrate including, in a plan view, a first area having a first light transmittance and a second area adjacent to the first area with a second light transmittance;
a plurality of pixels disposed on the substrate to display an image;
a plurality of thin film transistors disposed on the substrate, each of the plurality of thin film transistors comprising an active layer, a gate electrode, a source electrode, and a drain electrode;
a photo sensor disposed in the first area below the substrate,
an insulating layer on the substrate;
a pixel defining layer on the substrate;
a passivation layer on the substrate; and
a first sensor disposed on the substrate to sense a touch position input by a user,
wherein the first light transmittance is greater than the second light transmittance to improve sensitivity of the photo sensor,
wherein the plurality of pixels include at least one first pixel in the first area and a second pixel in the second area,
wherein the first pixel includes a light emitting area and a light transmission area,
wherein the at least one first pixel includes at least one first sub-pixel disposed in the light emitting area,
wherein the first sub-pixel comprises:
a first electrode disposed on the substrate;
an emission layer disposed on the first electrode; and
a second electrode disposed on the emission layer,
wherein the insulating layer is disposed between the active layer and the first electrode,
wherein the passivation layer is disposed between the source electrode or the drain electrode and the first electrode,
wherein the first sub-pixel further includes at least one structure selected from the group of a hole injection layer, a hole transport layer, an electron transport layer, and an electron injection layer, the at least one structure being disposed between the first electrode and the second electrode,
wherein a portion of the insulating layer is not disposed in the light transmission area in the first area,
wherein a portion of the passivation layer is not disposed in the light transmission area in the first area,
wherein a portion of the second electrode is not disposed in the light transmission area in the first area,
wherein the second pixel includes at least one second sub-pixel,
wherein each of the first sub-pixel and the second sub-pixel emits one wavelength of light selected from the group of red light, green light, and blue light,
wherein the first sensor is a touch sensor of a self-capacitance type or a touch sensor of a mutual-capacitance type, wherein the first sensor includes:
a first touch electrode; and
a second touch electrode spaced apart from the first touch electrode and forming a capacitance with the first touch electrode, and
wherein each of the first touch electrode and the second touch electrode comprises a mesh structure.

28. The display device of claim 27, wherein a size of the first sub-pixel is smaller than a size of the second sub-pixel.

29. The display device of claim 28, wherein a size of the first pixel is substantially the same as a size of the second pixel.

30. A display device comprising:
a substrate including, in a plan view, a first area having a first light transmittance and a second area adjacent to the first area with a second light transmittance;
a plurality of pixels disposed on the substrate to display an image;
a plurality of thin film transistors disposed on the substrate, each of the plurality of thin film transistors comprising an active layer, a gate electrode, a source electrode, and a drain electrode;
an insulating layer on the substrate;
a pixel defining layer on the substrate;
a passivation layer on the substrate; and
a first sensor disposed on the substrate to sense a touch position input by a user,
wherein the first light transmittance is greater than the second light transmittance,
wherein the plurality of pixels include at least one first pixel in the first area and a second pixel in the second area,
wherein the first pixel includes a light emitting area and a light transmission area,
wherein the first pixel includes at least one first sub-pixel disposed in the light emitting area,
wherein the first sub-pixel comprises:
a first electrode disposed on the substrate;
an emission layer disposed on the first electrode; and
a second electrode disposed on the emission layer,
wherein the insulating layer is disposed between the active layer and the first electrode,
wherein the passivation layer is disposed between the source electrode or the drain electrode and the first electrode,
wherein the first sub-pixel further includes at least one structure selected from the group of a hole injection layer, a hole transport layer, an electron transport layer, and an electron injection layer, the at least one structure being disposed between the first electrode and the second electrode,
wherein a portion of the insulating layer is not disposed in the light transmission area in the first area,
wherein a portion of the passivation layer is not disposed in the light transmission area in the first area,
wherein a portion of the second electrode is not disposed in the light transmission area in the first area,
wherein the first sub-pixel emits one wavelength of light selected from the group of red light, green light, and blue light,
wherein the first sensor is a touch sensor of a self-capacitance type or a touch sensor of a mutual-capacitance type,
wherein the first sensor includes:
a first touch electrode; and
a second touch electrode spaced apart from the first touch electrode and forming a capacitance with the first touch electrode, and
wherein each of the first touch electrode and the second touch electrode comprises a mesh structure.

31. The display device of claim 30, wherein the second pixel includes at least one second sub-pixel, and
a size of the at least one first sub-pixel is smaller than a size of the second sub-pixel.

32. The display device of claim 31, wherein a size of the first pixel is substantially the same as a size of the second pixel.

33. The display device of claim 30, further comprising a photo sensor disposed in the first area below the substrate.

34. The display device of claim 30, wherein a portion of the first sensor and the first area are not overlapped in the plan view.

35. A display device comprising:
a substrate including, in a plan view, a first area having a first light transmittance and a second area adjacent to the first area with a second light transmittance;
a plurality of pixels disposed on the substrate to display an image; and
a first sensor disposed on the substrate to sense a touch position input by a user,
wherein the first light transmittance is greater than the second light transmittance,
wherein the first area includes a light emitting area having a first size and a light transmission area having a second size through which light is transmitted, the light transmission area being different from the light emitting area,
wherein the first size is smaller than the second size,
wherein each of the plurality of pixels includes at least one sub-pixel disposed in the light emitting area, and
wherein the sub-pixel comprises:
a first electrode disposed on the substrate;
an emission layer disposed on the first electrode; and
a second electrode disposed on the emission layer,
wherein the sub-pixel emits one wavelength of light selected from the group of red light, green light, and blue light,
wherein the first sensor is a touch sensor of a self-capacitance type or a touch sensor of a mutual-capacitance type,
wherein the first sensor includes:
a first touch electrode; and
a second touch electrode spaced apart from the first touch electrode and forming a capacitance with the first touch electrode, and
wherein each of the first touch electrode and the second touch electrode comprises a mesh structure.

36. The display device of claim 35, further comprising a photo sensor disposed in the first area below the substrate.

37. The display device of claim 36, wherein a portion of the first sensor and the first area are not overlapped in the plan view.

38. The display device of claim 35, wherein a portion of the first sensor and the first area are not overlapped in the plan view.

* * * * *